(12) United States Patent
Kim et al.

(10) Patent No.: US 9,980,287 B2
(45) Date of Patent: May 22, 2018

(54) METHOD AND APPARATUS FOR ACCESS IN WIRELESS LAN SYSTEM

(71) Applicant: LG ELECTRONICS INC., Seoul (KR)

(72) Inventors: Jeongki Kim, Anyang-si (KR); Hangyu Cho, Anyang-si (KR); Jinsoo Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 185 days.

(21) Appl. No.: 14/779,291

(22) PCT Filed: Dec. 30, 2013

(86) PCT No.: PCT/KR2013/012389
§ 371 (c)(1),
(2) Date: Sep. 22, 2015

(87) PCT Pub. No.: WO2014/163285
PCT Pub. Date: Oct. 9, 2014

(65) Prior Publication Data
US 2016/0057779 A1    Feb. 25, 2016

Related U.S. Application Data

(60) Provisional application No. 61/807,342, filed on Apr. 2, 2013, provisional application No. 61/807,766, filed
(Continued)

(51) Int. Cl.
*H04W 74/08* (2009.01)
*H04W 72/04* (2009.01)
(Continued)

(52) U.S. Cl.
CPC ............ *H04W 74/08* (2013.01); *H04L 1/1614* (2013.01); *H04L 47/225* (2013.01); *H04L 47/27* (2013.01);
(Continued)

(58) Field of Classification Search
CPC ............... H04W 74/006; H04W 74/08; H04W 72/0446; H04L 47/225; H04L 47/27; H04L 1/1614
See application file for complete search history.

(56) References Cited

U.S. PATENT DOCUMENTS 9,137,823 B1 *   9/2015   Liu ................... H04W 74/006
2004/0264428 A1   12/2004   Choi et al.
(Continued)

FOREIGN PATENT DOCUMENTS

CN           102833824        12/2012
KR     10-2005-0003575         1/2005
(Continued)

OTHER PUBLICATIONS

Kwon, et al., "Periodic Channel Access", doc.: IEEE 802.11-12/1311r0, XP068040152, Nov. 2012, 13 pages.
(Continued)

*Primary Examiner* — Redentor Pasia
(74) *Attorney, Agent, or Firm* — Lee Hong Degerman Kang & Waimey

(57) ABSTRACT

An embodiment of the present invention provides a method for accessing to a medium by a station (STA) in a wireless LAN system, the method comprising the steps of: receiving a predetermined frame including a time stamp; identifying a restricted access window (RAW) assignment field included in the predetermined frame; and performing access in a slot determined on the basis of a subfield of the RAW assignment field when the STA belongs to a RAW related to the RAW
(Continued)

allocation field, wherein whether the STA belongs to the RAW is determined by whether an association identifier (AID) of the STA is included in a AID range and the RAW assignment field includes a subfield indicating whether the AID range is determined by a TIM bitmap.

10 Claims, 25 Drawing Sheets

Related U.S. Application Data on Apr. 3, 2013, provisional application No. 61/809,433, filed on Apr. 8, 2013, provisional application No. 61/820,697, filed on May 8, 2013, provisional application No. 61/821,245, filed on May 9, 2013, provisional application No. 61/845,383, filed on Jul. 12, 2013.

(51) Int. Cl.
```
H04L 12/807    (2013.01)
H04L 12/815    (2013.01)
H04L 1/16      (2006.01)
H04W 74/00     (2009.01)
H04W 84/12     (2009.01)
```
(52) U.S. Cl.
CPC ..... *H04W 72/0446* (2013.01); *H04W 74/006* (2013.01); *H04W 84/12* (2013.01)

(56) References Cited

U.S. PATENT DOCUMENTS

| | | | | | |
|---|---|---|---|---|---|
| 2014/0254497 | A1* | 9/2014 | Ghosh | ........... | H04W 74/04 370/329 |
| 2015/0382283 | A1* | 12/2015 | Wang | ........... | H04W 52/0216 370/328 |
| 2016/0021656 | A1* | 1/2016 | Park | ........... | H04B 7/24 370/329 |

FOREIGN PATENT DOCUMENTS

| | | |
|---|---|---|
| KR | 10-2007-0083518 | 8/2007 |
| KR | 10-2008-0083086 | 9/2008 |
| RU | 2340111 | 11/2004 |
| WO | 2012/077901 | 6/2012 |
| WO | 2012/077908 | 6/2012 |
| WO | 2012159082 | 11/2012 |
| WO | 2013134231 | 9/2013 |

OTHER PUBLICATIONS

Seok, et al., "Uplink Channel Access General Procedure", doc.: IEEE 802.11-12/0831r0, XP068039355, Jul. 2012, 19 pages.

Kim, et al., "RAW Assignment follow up", doc.: IEEE 802.11-13/0510r1, May 2013, 12 pages.

Kim, et al., "CC9 Comment resolution for CID 224", doc.: IEEE 802.11-10/1241r60, Jul. 2013, 3 pages.

Ghosh, et al., "Restricted Access Window Signaling for Uplink Channel Access", doc.: IEEE 802.11-12/0843r0, Jul. 2012, 13 pages.

European Patent Office Application Serial No. 13881309.2, Search Report dated Nov. 3, 2016, 7 pages.

Russian Federation Federal Service for Intellectual Property, Patents and Trademarks Application Serial No. 2015141480/08, Office Action dated Feb. 8, 2017, 12 pages.

PCT International Application No. PCT/KR2013/012389, Written Opinion of the International Searching Authority dated Apr. 29, 2014, 17 pages.

IP Australia Application Serial No. 2013385753, Notice of Allowance dated Jul. 13, 2016, 2 pages.

The State Intellectual Property Office of the People's Republic of China Application No. 201380075360.1, Office Action dated Jan. 31, 2018, 14 pages.

* cited by examiner

FIG. 15
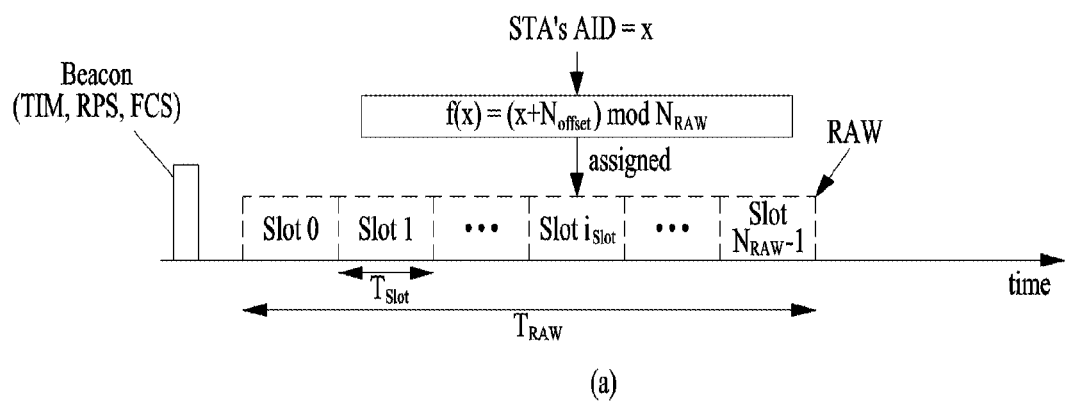
(a)
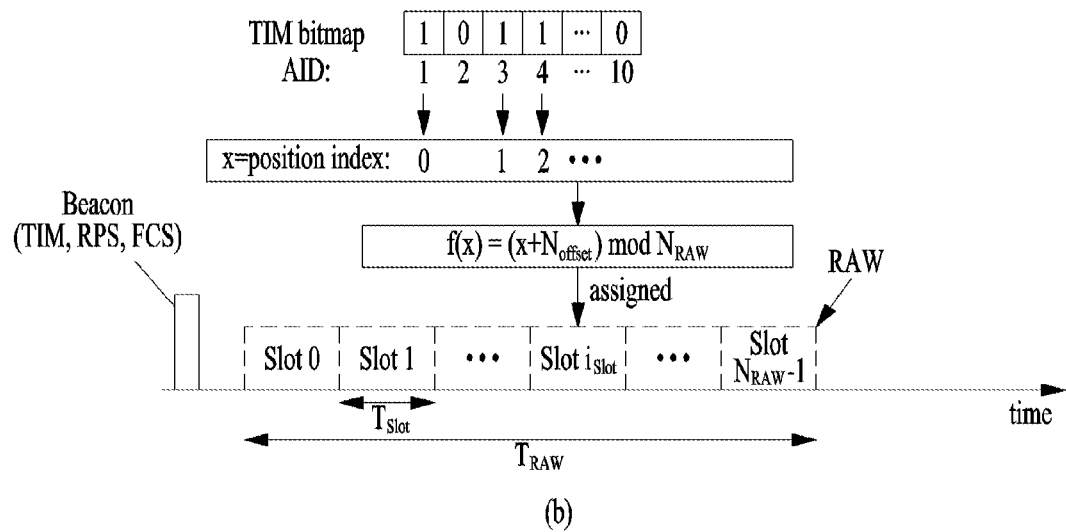
(b)

FIG. 27

| PRAW indication (0) | Same TIM Indication | Same Group Indication | RAW Group | RAW Start Time (TU) | RAW Duration (TU) | Options | RAW Slot Definition | Channel Indication | AP PM |
|---|---|---|---|---|---|---|---|---|---|
| 1 | 1 | 1 | 24 | 8 | TBD | 3 | TBD | 8 | 1 |

Bits:

FIG. 28

| PRAW indication (0) | Same TIM Indication (0) | Same Group Indication | RAW Group | RAW Start Time (TU) | RAW Duration (TU) | Options | RAW Slot Definition | Channel Indication | AP PM |
|---|---|---|---|---|---|---|---|---|---|
| 1 | 1 | 1 | 24 | 8 | TBD | 3 | TBD | 8 | 1 |

Bits:

(a) Same TIM Indication = 0

| PRAW indication (0) | Same TIM Indication (1) | RAW Start Time (TU) | RAW Duration (TU) | Options | RAW Slot Definition | Channel Indication | AP PM |
|---|---|---|---|---|---|---|---|
| 1 | 1 | 8 | TBD | 3 | TBD | 8 | 1 |

Bits:

(b) Same TIM Indication = 1

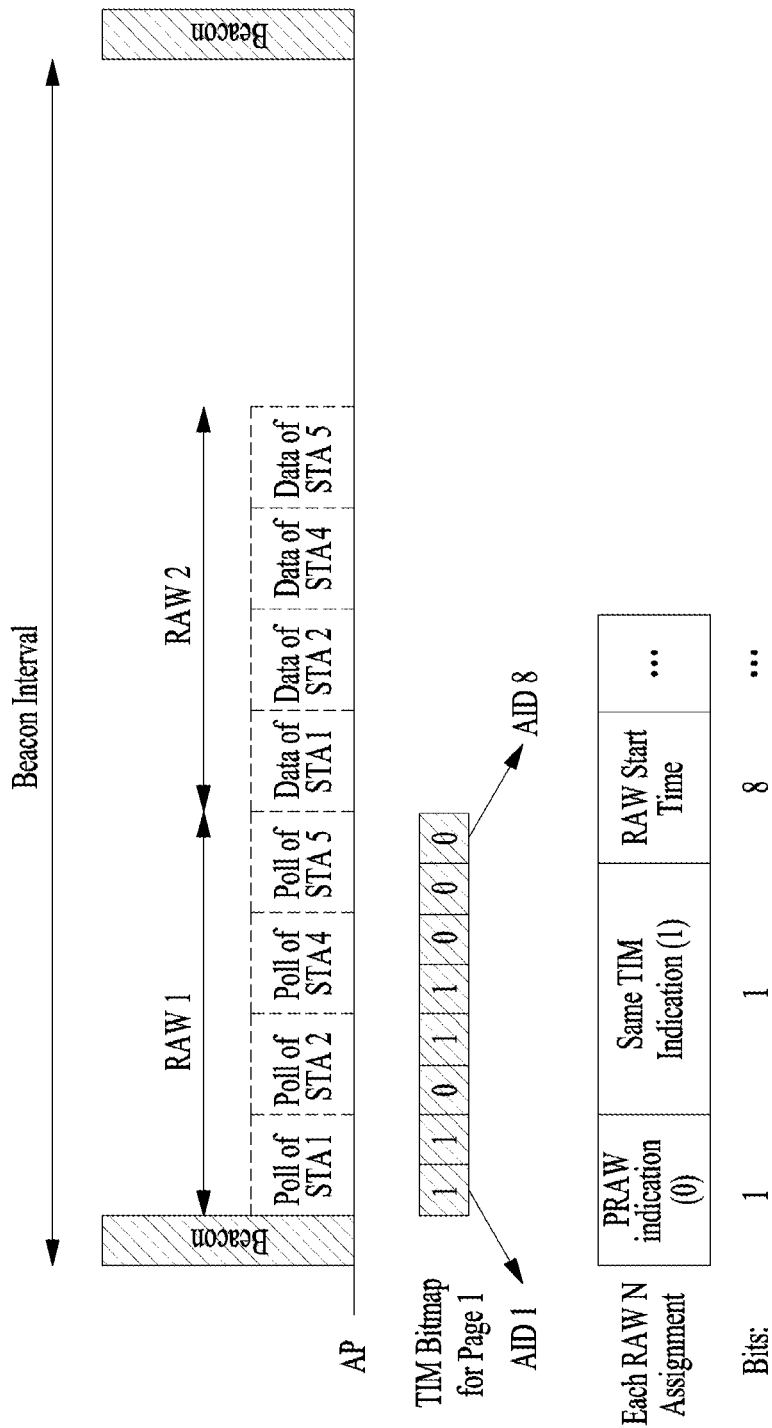

METHOD AND APPARATUS FOR ACCESS IN WIRELESS LAN SYSTEM

CROSS-REFERENCE TO RELATED APPLICATIONS

This application is the National Stage filing under 35 U.S.C. 371 of International Application No. PCT/KR2013/012389, filed on Dec. 30, 2013, which claims the benefit of U.S. Provisional Application No. 61/807,342, filed on Apr. 2, 2013, 61/807,766, filed on Apr. 3, 2013, 61/809,433, filed on Apr. 8, 2013, 61/820,697, filed on May 8, 2013, 61/821,245, filed on May 9, 2013 and 61/845,383, filed on Jul. 12, 2013, the contents of which are all hereby incorporated by reference herein in their entirety.

TECHNICAL FIELD

The present disclosure relates to a wireless communication system and, more particularly, to a method and apparatus for access in a Wireless LAN system.

BACKGROUND ART

With recent development of information communication technologies, a variety of wireless communication technologies have been developed. From among such technologies, WLAN is a technology that enables wireless Internet access at home, in businesses, or in specific service providing areas using a mobile terminal, such as a personal digital assistant (PDA), a laptop computer, or a portable multimedia player (PMP), based on radio frequency technology.

In order to overcome limited communication speed, which has been pointed out as a weak point of WLAN, technical standards have recently introduced a system capable of increasing the speed and reliability of a network while extending coverage of a wireless network. For example, IEEE 802.11n supports high throughput (HT) with a maximum data processing rate of 540 Mbps. In addition, Multiple Input Multiple Output (MIMO) technology, which employs multiple antennas for both a transmitter and a receiver in order to minimize transmission errors and optimize data rate, has been introduced.

Machine-to-machine (M2M) communication technology has been discussed as a next generation communication technology. A technical standard to support M2M communication in the IEEE 802.11 WLAN system is also under development as IEEE 802.11ah. In M2M communication, a scenario in which a small amount of data is occasionally communicated at a low speed in an environment having a large number of devices may be considered.

Communication in the WLAN system is performed on a medium shared by all devices. If the number of devices increases as in M2M communication, a channel access mechanism needs to be efficiently improved in order to reduce unnecessary power consumption and interference.

DISCLOSURE

Technical Problem

An object of the present invention relates to indication and field configuration for a situation in which the range of association IDs (AIDs) allocated to a Restricted Access Window (RAW) is identical to the AID range in a Traffic Indication Map (TIM).

Objects of the present invention are not limited to the aforementioned object, and other objects of the present invention which are not mentioned above will become apparent to those having ordinary skill in the art upon examination of the following description.

Technical Solution

In a first aspect of the present invention, provided herein is a method for performing access to a medium by a station (STA) in a wireless communication system, the method including receiving a predetermined frame containing a timestamp, checking a Restricted Access Window (RAW) Assignment field contained in the predetermined frame, and performing access in a slot determined based on a subfield of the RAW Assignment field when the STA belongs to a RAW group related to the RAW Assignment field, wherein whether or not the STA belongs to the RAW group is determined depending on whether or not an association identifier (AID) of the STA is within an AID range, wherein the RAW Assignment field includes a subfield indicating whether or not the AID range is determined by a TIM bitmap.

In a second aspect of the present invention, provided herein is a station (STA) for performing access to a medium in a wireless communication system, the STA including a transceiver module, and a processor, wherein the processor is configured to receive a predetermined frame containing a timestamp, check a Restricted Access Window (RAW) Assignment field contained in the predetermined frame, and perform access in a slot determined based on a subfield of the RAW Assignment field when the STA belongs to a RAW group related to the RAW Assignment field, wherein whether or not the STA belongs to the RAW group is determined depending on whether or not an association identifier (AID) of the STA is within an AID range, wherein the RAW Assignment field includes a subfield indicating whether or not the AID range is determined by a TIM bitmap.

The first and second aspects of the present invention may include the following details.

When the RAW Assignment field is a first RAW Assignment field of an RPS element and Same Group Indication is set to 0, the AID range may be determined by a RAW Group field.

An Options value contained in a subfield identical to the Same Group Indication may be set to 0.

STAs included in the AID range may be allowed to perform the access even if the STA are not paged in the TIM bitmap.

When the RAW Assignment field is a first RAW Assignment field of an RPS element and Same Group Indication is set to 1, the first RAW Assignment field may not include a RAW Group field.

The TIM bitmap may be contained in the predetermined frame.

The predetermined frame may be either a beacon frame or a (short) beacon frame.

When the RAW Assignment field is a second RAW Assignment field or a RAW Assignment field after the second RAW Assignment field in an RPS element and a Same Group Indication subfield is set to 1, the RAW Assignment field may not include a RAW Group field.

The RAW Assignment field may be contained in a RAW Parameter Set (RPS) element.

An RPS element may contain one or more RAW Assignment fields.

Advantageous Effects

According to embodiments of the present invention, the RAW group field may be omitted, and thus the size of the beacon frame may be reduced.

The effects that can be obtained from the present invention are not limited to the aforementioned effects, and other effects may be clearly understood by those skilled in the art from the descriptions given below.

DESCRIPTION OF DRAWINGS

The accompanying drawings, which are intended to provide a further understanding of the present invention, illustrate various embodiments of the present invention and together with the descriptions in this specification serve to explain the principle of the invention.

FIGS. 14 to 16 illustrate a RAW and an RPS element.

FIGS. 26 to 30 illustrate Embodiment 2 of the present invention.

BEST MODE

Figure 1:
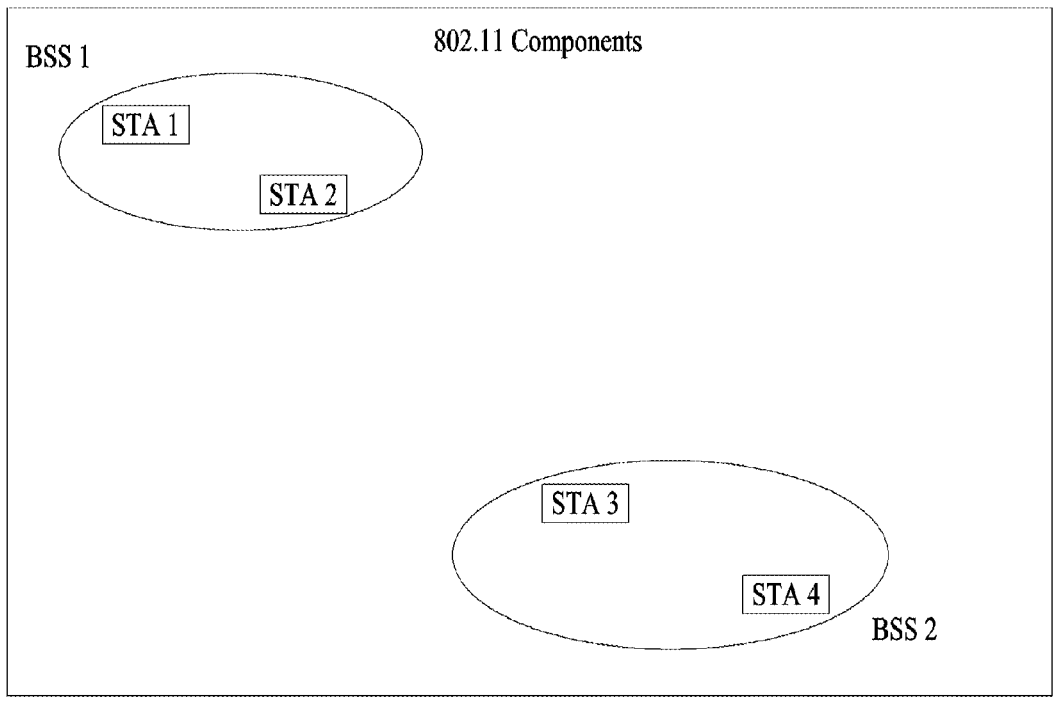
FIG. 1 is a diagram showing an exemplary structure of an IEEE 802.11 system to which the present invention is applicable.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by radio technology such as universal terrestrial radio access (UTRA) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, evolved-UTRA (E-UTRA), etc. For clarity, the present disclosure focuses on 3GPP LTE and LTE-A systems. However, the technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent station (STA) mobility for a higher layer may be provided by mutual operations of the components. A basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in a corresponding BSS maintain communication. This area may be referred to as a basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a type of LAN may be configured as necessary instead of being prescheduled and is also called an ad-hoc network.

Memberships of an STA in the BSS may be dynamically changed when the STA becomes an on or off state or the STA enters or leaves a region of the BSS. To become a member of the BSS, the STA may use a synchronization process to join the BSS. To access all services of a BSS infrastructure, the STA should be associated with the BSS. Such association may be dynamically configured and may include use of a distributed system service (DSS).

Figure 2:
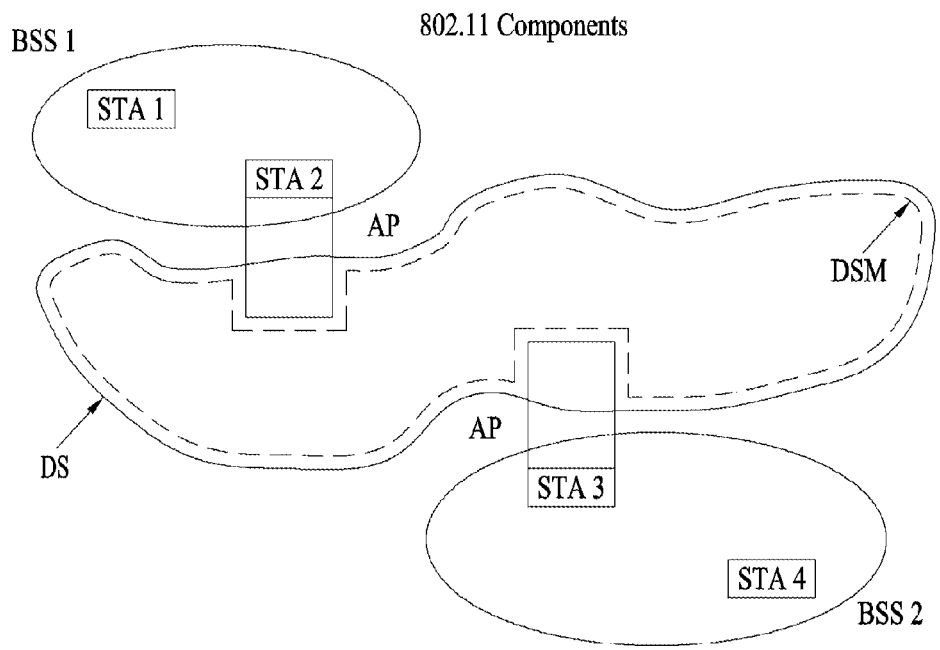
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a wireless medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may be always received by an uncontrolled port and may be processed by an IEEE 802.1X port access entity. If the controlled port is authenticated, transmission data (or frame) may be transmitted to the DS.

Figure 3:
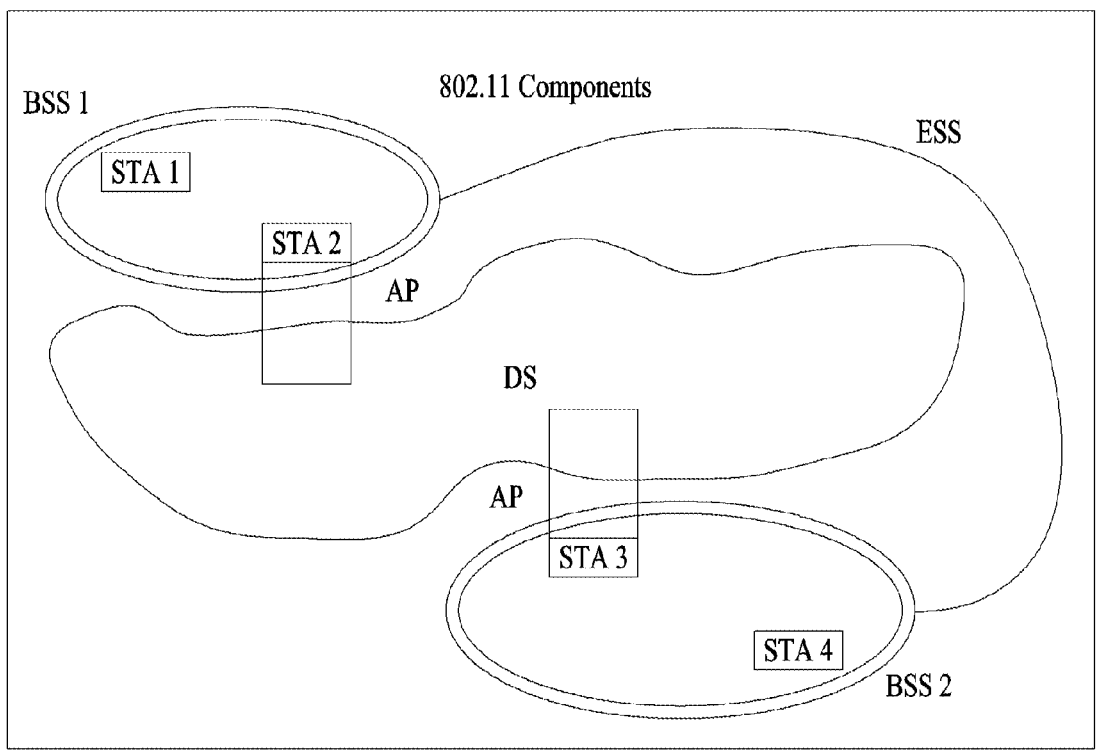
FIG. 3 is a diagram showing yet another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a logical link control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS networks may be physically located in the same space as one (or more than one) ESS network. This may correspond to an ESS network form in the case in which an ad-hoc network operates in a location in which an ESS network is present, the case in which IEEE 802.11 networks different organizations physically overlap, or the case in which two or more different access and security policies are necessary in the same location.

Figure 4:
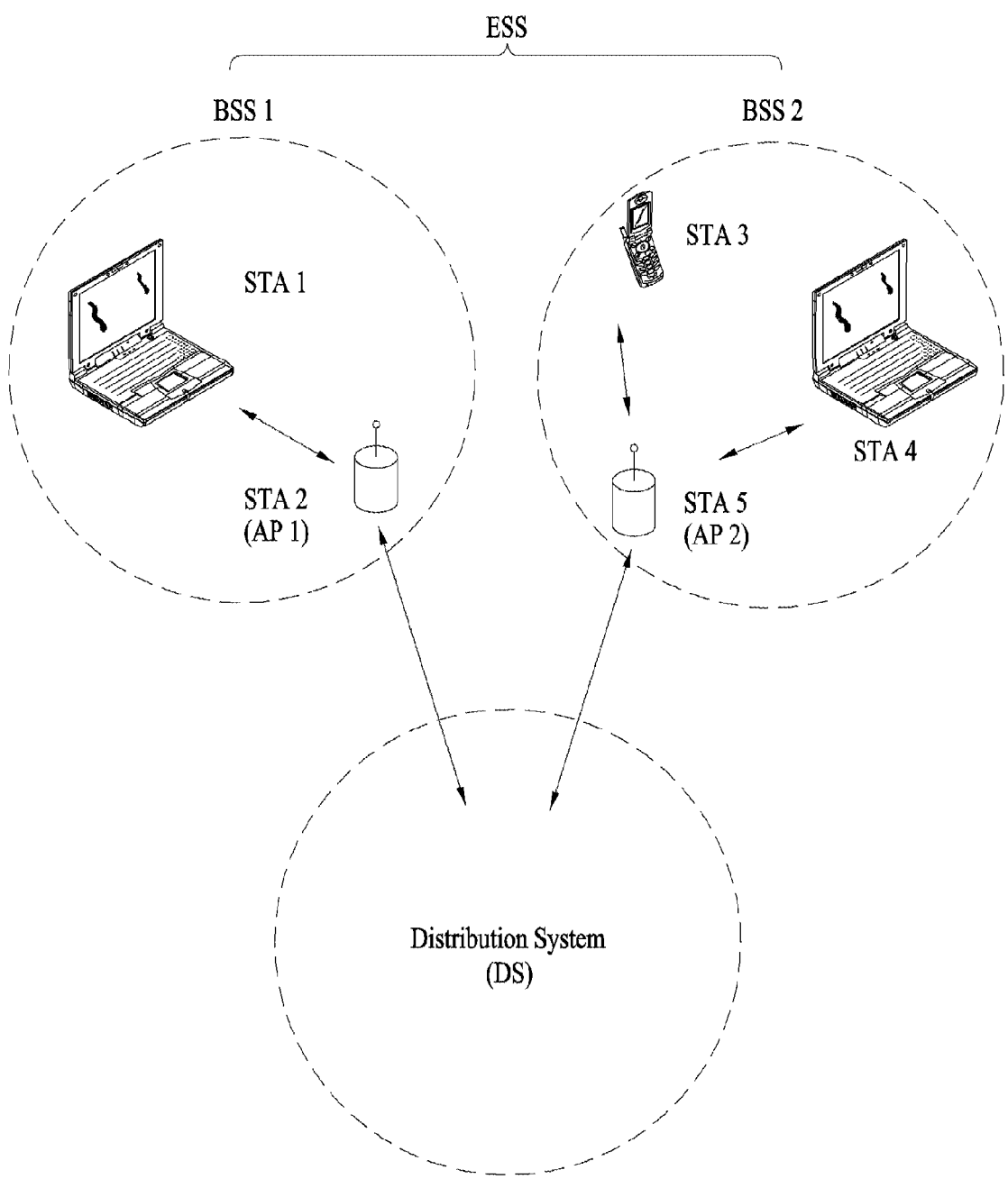
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal, or a mobile subscriber station (MSS). The AP is a concept corresponding to a base station (BS), a Node-B, an evolved Node-B (eNB), a base transceiver system (BTS), or a femto BS in other wireless communication fields.

Link Setup Process

Figure 5:
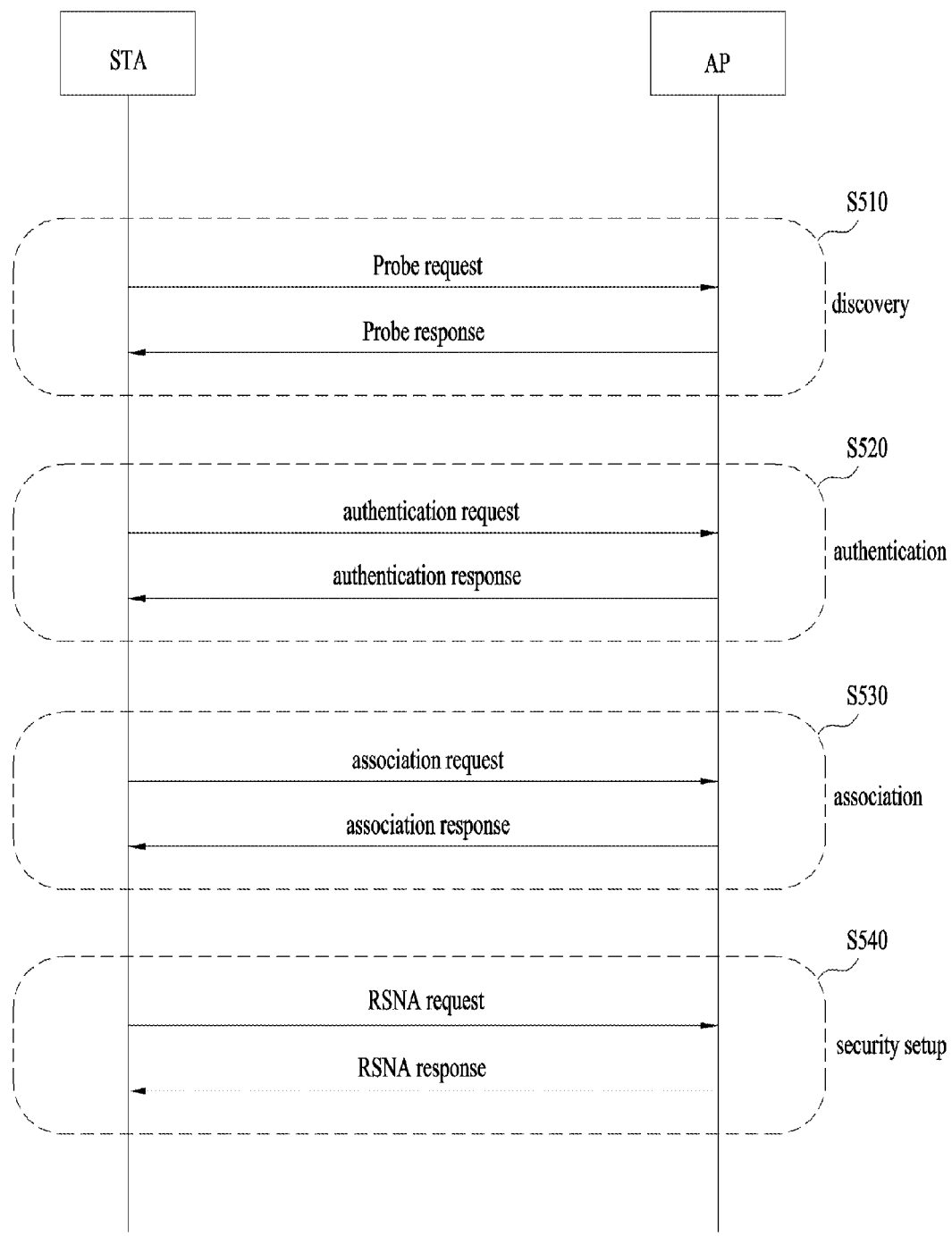
FIG. 5 illustrates a link setup process in a WLAN system.

FIG. 5 is a diagram for explaining a general link setup process.

In order to allow an STA to establish link setup on a network and transmit/receive data over the network, the STA should perform processes of network discovery, authentication, association establishment, security setup, etc. The link setup process may also be referred to as a session initiation processor or a session setup process. In addition, discovery, authentication, association, and security setup of the link setup process may also called an association process.

An exemplary link setup process is described with reference to FIG. 5.

In step S510, an STA may perform a network discovery action. The network discovery action may include an STA scanning action. That is, in order to access the network, the STA should search for an available network. The STA needs to identify a compatible network before participating in a wireless network and the process of identifying the network present in a specific area is referred to as scanning.

Scanning is categorized into active scanning and passive scanning.

FIG. 5 exemplarily illustrates a network discovery action including an active scanning process. An STA performing active scanning transmits a probe request frame in order to determine which AP is present in a peripheral region while moving between channels and waits for a response to the probe request frame. A responder transmits a probe response frame in response to the probe request frame to the STA that has transmitted the probe request frame. Here, the responder may be an STA that has finally transmitted a beacon frame in a BSS of the scanned channel. Since an AP transmits a beacon frame in a BSS, the AP is a responder. In an IBSS, since STAs of the IBSS sequentially transmit the beacon frame, a responder is not the same. For example, an STA, that has transmitted the probe request frame at channel #1 and has received the probe response frame at channel #1, stores BSS-related information contained in the received probe response frame, and moves to the next channel (e.g. channel #2). In the same manner, the STA may perform scanning (i.e. probe request/response transmission and reception at Channel #2).

Although not shown in FIG. 5, the scanning action may also be carried out using passive scanning. An STA that performs passive scanning awaits reception of a beacon frame while moving from one channel to another channel. The beacon frame is one of management frames in IEEE 802.11. The beacon frame is periodically transmitted to indicate the presence of a wireless network and allow a scanning STA to search for the wireless network and thus join the wireless network. In a BSS, an AP is configured to periodically transmit the beacon frame and, in an IBSS, STAs in the IBSS are configured to sequentially transmit the beacon frame. Upon receipt of the beacon frame, the scanning STA stores BSS-related information contained in the beacon frame and records beacon frame information on each channel while moving to another channel. Upon receiving the beacon frame, the STA may store BSS-related information contained in the received beacon frame, move to the next channel, and perform scanning on the next channel using the same method.

Active scanning is more advantageous than passive scanning in terms of delay and power consumption.

After discovering the network, the STA may perform an authentication process in step S520. The authentication process may be referred to as a first authentication process in order to clearly distinguish this process from the security setup process of step S540.

The authentication process includes a process in which an STA transmits an authentication request frame to an AP and the AP transmits an authentication response frame to the STA in response to the authentication request frame. The authentication frame used for authentication request/response corresponds to a management frame.

The authentication frame may include information about an authentication algorithm number, an authentication transaction sequence number, a state code, a challenge text, a robust security network (RSN), a finite cyclic group (FCG), etc. The above-mentioned information contained in the authentication frame may correspond to some parts of information capable of being contained in the authentication request/response frame and may be replaced with other information or include additional information.

The STA may transmit the authentication request frame to the AP. The AP may determine whether to permit authentication for the corresponding STA based on the information contained in the received authentication request frame. The AP may provide an authentication processing result to the STA through the authentication response frame.

After the STA has been successfully authenticated, an association process may be carried out in step S530. The association process includes a process in which the STA transmits an association request frame to the AP and the AP transmits an association response frame to the STA in response to the association request frame.

For example, the association request frame may include information associated with various capabilities, a beacon listen interval, a service set identifier (SSID), supported rates, supported channels, an RSN, a mobility domain, supported operating classes, a traffic indication map (TIM) broadcast request, interworking service capability, etc.

For example, the association response frame may include information associated with various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a quality of service (QoS) map, etc.

The above-mentioned information may correspond to some parts of information capable of being contained in the association request/response frame and may be replaced with other information or include additional information.

After the STA has been successfully associated with the network, a security setup process may be performed in step S540. The security setup process of step S540 may be referred to as an authentication process based on robust security network association (RSNA) request/response. The authentication process of step S520 may be referred to as a first authentication process and the security setup process of step S540 may also be simply referred to as an authentication process.

The security setup process of step S540 may include a private key setup process through 4-way handshaking based on, for example, an extensible authentication protocol over LAN (EAPOL) frame. In addition, the security setup process may also be performed according to other security schemes not defined in IEEE 802.11 standards.

WLAN Evolution

To overcome limitations of communication speed in a WLAN, IEEE 802.11n has recently been established as a communication standard. IEEE 802.11n aims to increase network speed and reliability and extend wireless network coverage. More specifically, IEEE 802.11n supports a high throughput (HT) of 540 Mbps or more. To minimize transmission errors and optimize data rate, IEEE 802.11n is based on MIMO using a plurality of antennas at each of a transmitter and a receiver.

With widespread supply of a WLAN and diversified applications using the WLAN, the necessity of a new WLAN system for supporting a higher processing rate than a data processing rate supported by IEEE 802.11n has recently emerged. A next-generation WLAN system supporting very high throughput (VHT) is one of IEEE 802.11 WLAN systems which have been recently proposed to support a data processing rate of 1 Gbps or more in a MAC service access point (SAP), as the next version (e.g. IEEE 802.11ac) of an IEEE 802.11n WLAN system.

To efficiently utilize a radio frequency (RF) channel, the next-generation WLAN system supports a multiuser (MU)-MIMO transmission scheme in which a plurality of STAs simultaneously accesses a channel. In accordance with the MU-MIMO transmission scheme, an AP may simultaneously transmit packets to at least one MIMO-paired STA.

In addition, support of WLAN system operations in whitespace (WS) has been discussed. For example, technology for introducing the WLAN system in TV WS such as an idle frequency band (e.g. 54 to 698 MHz band) due to transition to digital TVs from analog TVs has been discussed under the IEEE 802.11af standard. However, this is for illustrative purposes only, and the WS may be a licensed band capable of being primarily used only by a licensed user. The licensed user is a user who has authority to use the licensed band and may also be referred to as a licensed device, a primary user, an incumbent user, etc.

For example, an AP and/or STA operating in WS should provide a function for protecting the licensed user. As an example, assuming that the licensed user such as a microphone has already used a specific WS channel which is a frequency band divided by regulations so as to include a specific bandwidth in the WS band, the AP and/or STA cannot use the frequency band corresponding to the corresponding WS channel in order to protect the licensed user. In addition, the AP and/or STA should stop using the corresponding frequency band under the condition that the licensed user uses a frequency band used for transmission and/or reception of a current frame.

Therefore, the AP and/or STA needs to determine whether a specific frequency band of a WS band can be used, in other words, whether a licensed user is present in the frequency band. A scheme for determining whether a licensed user is present in a specific frequency band is referred to as spectrum sensing. An energy detection scheme, a signature detection scheme, etc. are used as the spectrum sensing mechanism. The AP and/or STA may determine that the frequency band is being used by a licensed user if the intensity of a received signal exceeds a predetermined value or if a DTV preamble is detected.

Machine-to-machine (M2M) communication technology has been discussed as next generation communication technology. Technical standard for supporting M2M communication has been developed as IEEE 802.11ah in an IEEE 802.11 WLAN system. M2M communication refers to a communication scheme including one or more machines or may also be called machine type communication (MTC) or machine-to-machine communication. In this case, the machine refers to an entity that does not require direct manipulation or intervention of a user. For example, not only a meter or vending machine including a radio communication module but also a user equipment (UE) such as a smartphone capable of performing communication by automatically accessing a network without user manipulation/intervention may be machines. M2M communication may include device-to-device (D2D) communication and communication between a device and an application server. As exemplary communication between a device and an application server, communication between a vending machine and an application server, communication between a point of sale (POS) device and an application server, and communication between an electric meter, a gas meter, or a water meter and an application server. M2M communication-based applications may include security, transportation, healthcare, etc. In the case of considering the above-mentioned application examples, M2M communication has to support occasional transmission/reception of a small amount of data at low speed under an environment including a large number of devices.

More specifically, M2M communication should support a large number of STAs. Although a currently defined WLAN system assumes that one AP is associated with a maximum of 2007 STAs, methods for supporting other cases in which more STAs (e.g. about 6000 STAs) than 2007 STAs are associated with one AP have been discussed in M2M communication. In addition, it is expected that many applications for supporting/requesting a low transfer rate are present in M2M communication. In order to smoothly support these requirements, an STA in the WLAN system may recognize the presence or absence of data to be transmitted thereto based on a TIM element and methods for reducing the bitmap size of the TIM have been discussed. In addition, it is expected that much traffic having a very long transmission/reception interval is present in M2M communication. For example, a very small amount of data such as electric/gas/water metering needs to be transmitted and received at long intervals (e.g. every month). Accordingly, although the number of STAs associated with one AP increases in the WLAN system, methods for efficiently supporting the case in which there are a very small number of STAs each including a data frame to be received from the AP during one beacon period has been discussed.

As described above, WLAN technology is rapidly developing and not only the above-mentioned exemplary technologies but also other technologies including direct link setup, improvement of media streaming throughput, support of high-speed and/or large-scale initial session setup, and support of extended bandwidth and operating frequency are being developed.

Medium Access Mechanism

In a WLAN system based on IEEE 802.11, a basic access mechanism of medium access control (MAC) is a carrier sense multiple access with collision avoidance (CSMA/CA) mechanism. The CSMA/CA mechanism is also referred to as a distributed coordination function (DCF) of the IEEE 802.11 MAC and basically adopts a "listen before talk" access mechanism. In this type of access mechanism, an AP and/or an STA may sense a wireless channel or a medium during a predetermined time duration (e.g. DCF interframe space (DIFS) before starting transmission. As a result of sensing, if it is determined that the medium is in an idle status, the AP and/or the STA starts frame transmission using the medium. Meanwhile, if it is sensed that the medium is in an occupied state, the AP and/or the STA does not start its transmission and may attempt to perform frame transmission after setting and waiting for a delay duration (e.g. a random backoff period) for medium access. Since it is expected that multiple STAs attempt to perform frame transmission after waiting for different time durations by applying the random backoff period, collision can be minimized.

An IEEE 802.11 MAC protocol provides a hybrid coordination function (HCF) based on the DCF and a point coordination function (PCF). The PCF refers to a scheme of performing periodic polling by using a polling-based synchronous access method so that all reception APs and/or STAs can receive a data frame. The HCF includes enhanced distributed channel access (EDCA) and HCF controlled channel access (HCCA). EDCA is a contention based access scheme used by a provider to provide a data frame to a plurality of users. HCCA uses a contention-free based channel access scheme employing a polling mechanism. The HCF includes a medium access mechanism for improving QoS of a WLAN and QoS data may be transmitted in both a contention period (CP) and a contention-free period (CFP).

Figure 6:
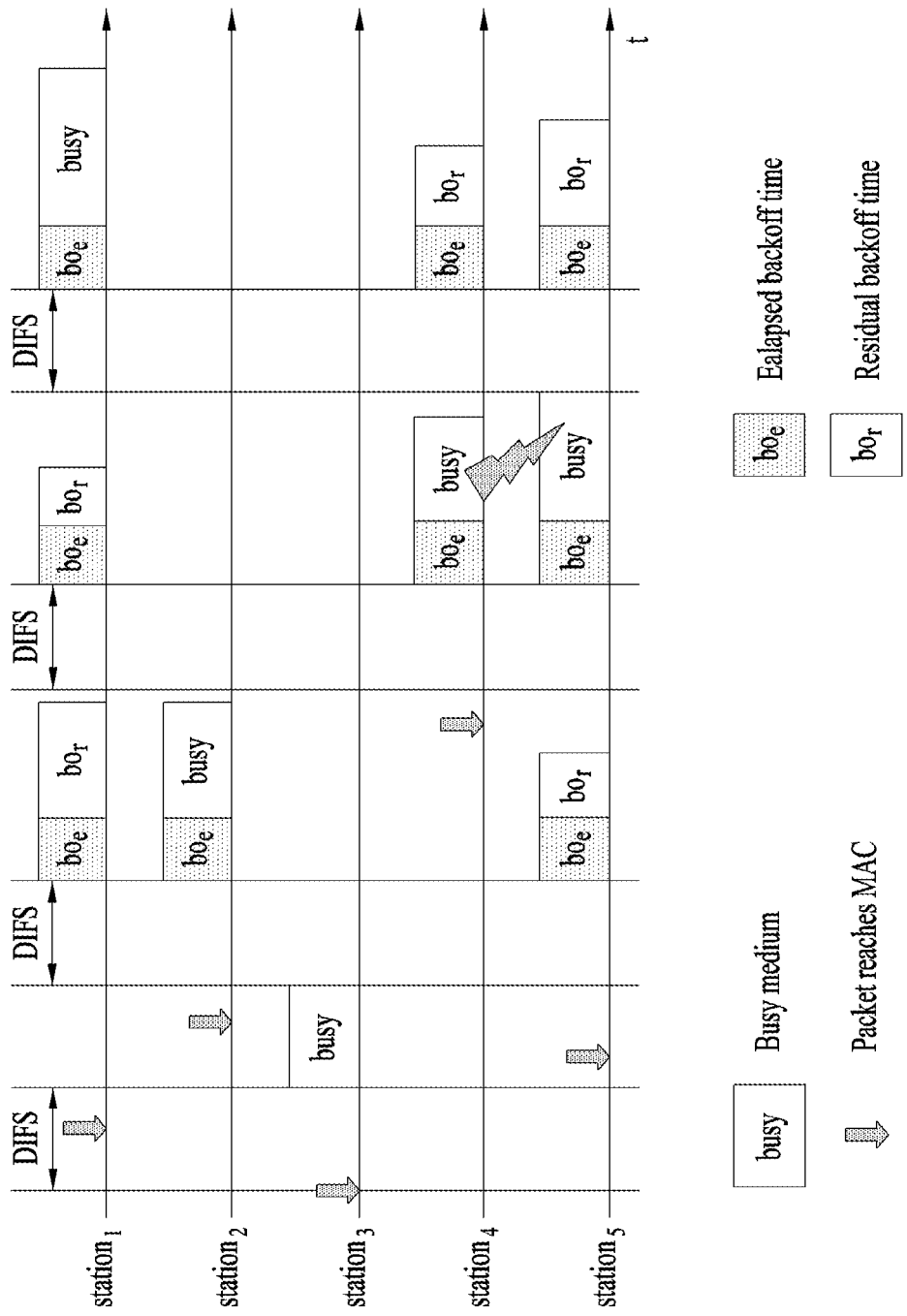
FIG. 6 illustrates a backoff process.

FIG. 6 is a diagram for explaining a backoff process.

Operations based on a random backoff period will now be described with reference to FIG. 6. If a medium of an occupy or busy state transitions to an idle state, several STAs may attempt to transmit data (or frames). As a method for minimizing collision, each STA may select a random backoff count, wait for a slot time corresponding to the selected backoff count, and then attempt to start data or frame transmission. The random backoff count may be a pseudo-random integer and may be set to one of 0 to CW values. In this case, CW is a contention window parameter value. Although CWmin is given as an initial value of the CW parameter, the initial value may be doubled in case of transmission failure (e.g. in the case in which ACK for the transmission frame is not received). If the CW parameter value reaches CWmax, the STAs may attempt to perform data transmission while CWmax is maintained until data transmission is successful. If data has been successfully transmitted, the CW parameter value is reset to CWmin. Desirably, CW, CWmin, and CWmax are set to $2^n-1$ (where n=0, 1, 2, . . . ).

If the random backoff process is started, the STA continuously monitors the medium while counting down the backoff slot in response to the determined backoff count value. If the medium is monitored as the occupied state, the countdown stops and waits for a predetermined time. If the medium is in the idle status, the remaining countdown restarts.

As shown in the example of FIG. 6, if a packet to be transmitted to MAC of STA3 arrives at STA3, STA3 may confirm that the medium is in the idle state during a DIFS and directly start frame transmission. In the meantime, the remaining STAs monitor whether the medium is in the busy state and wait for a predetermined time. During the predetermined time, data to be transmitted may occur in each of STA1, STA2, and STA5. If it is monitored that the medium is in the idle state, each STA waits for the DIFS time and then may perform countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of STA2 is finished and the medium re-enters the idle state, each of STA1 and STA5 waits for a predetermined time DIFS and restarts backoff counting. That is, after counting down the remaining backoff time corresponding to the residual backoff time, each of STA1 and STA5 may start frame transmission. Since the residual backoff time of STA5 is shorter than that of STA1, STA5 starts frame transmission. Meanwhile, data to be transmitted may occur even in STA4 while STA2 occupies the medium. In this case, if the medium is in the idle state, STA4 may wait for the DIFS time, perform countdown in response to the random backoff count value selected thereby, and then start frame transmission. FIG. 6 exemplarily shows the case in which the residual backoff time of STA5 is identical to the random backoff count value of STA4 by chance. In this case, collision may occur between STA4 and STA5. Then, each of STA4 and STA5 does not receive ACK, resulting in occurrence of data transmission failure. In this case, each of STA4 and STA5 may increase the CW value by two times, select a random backoff count value, and then perform countdown. Meanwhile, STA1 waits for a predetermined time while the medium is in the occupied state due to transmission of STA4 and STA5. If the medium is in the idle state, STA1 may wait for the DIFS time and then start frame transmission after lapse of the residual backoff time.

STA Sensing Operation

As described above, the CSMA/CA mechanism includes not only a physical carrier sensing mechanism in which the AP and/or an STA directly senses a medium but also a virtual carrier sensing mechanism. The virtual carrier sensing mechanism can solve some problems such as a hidden node problem encountered in medium access. For virtual carrier sensing, MAC of the WLAN system may use a network allocation vector (NAV). The NAV is a value used to indicate a time remaining until an AP and/or an STA which is currently using the medium or has authority to use the medium enters an available state to another AP and/or STA. Accordingly, a value set to the NAV corresponds to a reserved time in which the medium will be used by an AP and/or STA configured to transmit a corresponding frame. An STA receiving the NAV value is not allowed to perform medium access during the corresponding reserved time. For example, NAV may be set according to the value of a 'duration' field of a MAC header of a frame.

A robust collision detection mechanism has been proposed to reduce the probability of collision. This will be described with reference to FIGS. 7 and 8. Although an actual carrier sensing range is different from a transmission range, it is assumed that the actual carrier sensing range is identical to the transmission range for convenience of description.

Figure 7:
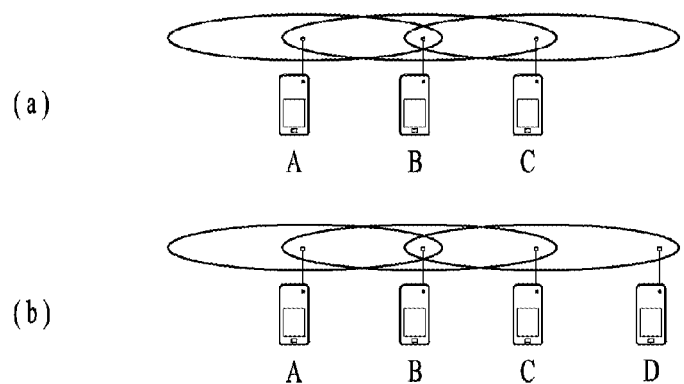
FIG. 7 illustrates a hidden node and an exposed node.

FIG. 7 is a diagram for explaining a hidden node and an exposed node.

FIG. 7(a) exemplarily shows a hidden node. In FIG. 7(a), STA A communicates with STA B, and STA C has information to be transmitted. Specifically, STA C may determine that a medium is in an idle state when performing carrier sensing before transmitting data to STA B, although STA A is transmitting information to STA B. This is because transmission of STA A (i.e. occupation of the medium) may not be detected at the location of STA C. In this case, STA B simultaneously receives information of STA A and information of STA C, resulting in occurrence of collision. Here, STA A may be considered a hidden node of STA C.

FIG. 7(b) exemplarily shows an exposed node. In FIG. 7(b), in a situation in which STA B transmits data to STA A, STA C has information to be transmitted to STA D. If STA C performs carrier sensing, it is determined that a medium is occupied due to transmission of STA B. Therefore, although STA C has information to be transmitted to STA D, since the medium-occupied state is sensed, STA C should wait for a predetermined time until the medium is in the idle state. However, since STA A is actually located out of the transmission range of STA C, transmission from STA C may not collide with transmission from STA B from the viewpoint of STA A, so that STA C unnecessarily enters a standby state until STA B stops transmission. Here, STA C is referred to as an exposed node of STA B.

Figure 8:
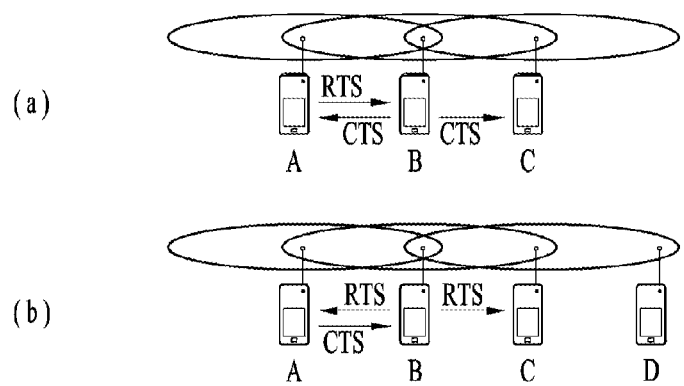
FIG. 8 illustrates RTS and CTS.

FIG. 8 is a diagram for explaining request to send (RTS) and clear to send (CTS).

To efficiently utilize a collision avoidance mechanism under the above-mentioned situation of FIG. 7, it is possible to use a short signaling packet such as RTS and CTS. RTS/CTS between two STAs may be overheard by peripheral STA(s), so that the peripheral STA(s) may consider whether information is transmitted between the two STAs. For example, if an STA to be used for data transmission transmits an RTS frame to an STA receiving data, the STA receiving data may inform peripheral STAs that itself will receive data by transmitting a CTS frame to the peripheral STAs.

FIG. 8(a) exemplarily shows a method for solving problems of a hidden node. In FIG. 8(a), it is assumed that both STA A and STA C are ready to transmit data to STA B. If STA A transmits RTS to STA B, STA B transmits CTS to each of STA A and STA C located in the vicinity of the STA B. As a result, STA C waits for a predetermined time until STA A and STA B stop data transmission, thereby avoiding collision.

FIG. 8(b) exemplarily shows a method for solving problems of an exposed node. STA C performs overhearing of RTS/CTS transmission between STA A and STA B, so that STA C may determine that no collision will occur although STA C transmits data to another STA (e.g. STA D). That is, STA B transmits RTS to all peripheral STAs and only STA A having data to be actually transmitted may transmit CTS. STA C receives only the RTS and does not receive the CTS of STA A, so that it can be recognized that STA A is located outside of the carrier sensing range of STA C.

Power Management

As described above, the WLAN system needs to perform channel sensing before an STA performs data transmission/reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
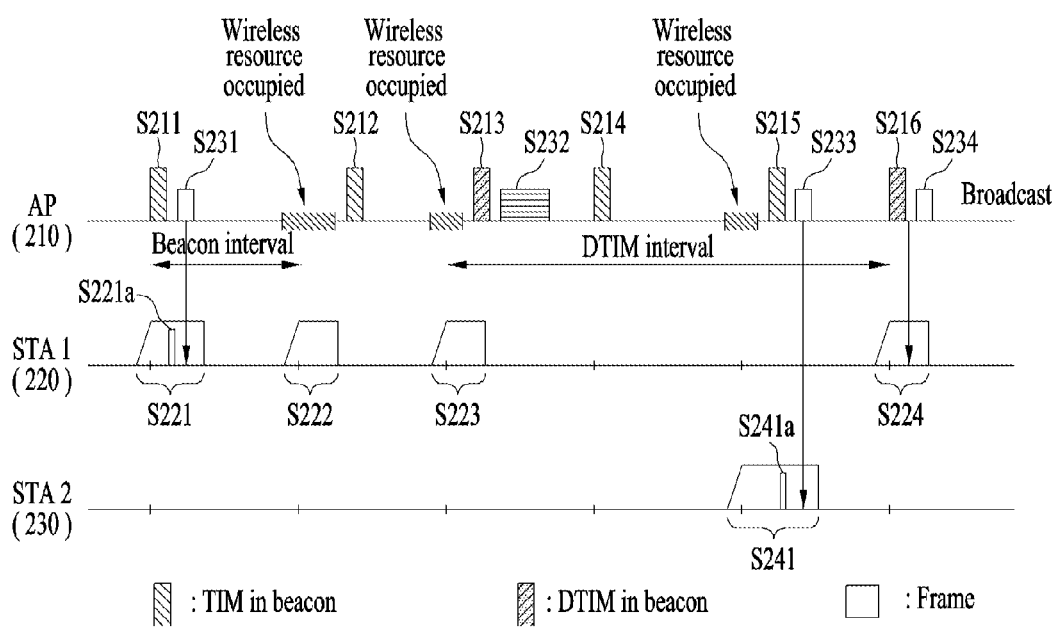
FIG. 9 illustrates a power management operation.

FIG. 9 is a diagram for explaining a PM operation.

Referring to FIG. 9, an AP 210 transmits a beacon frame to STAs present in a BSS at intervals of a predetermined time period (S211, S212, S213, S214, S215, and S216). The beacon frame includes a TIM information element. The TIM information element includes buffered traffic regarding STAs associated with the AP 210 and includes information indicating that a frame is to be transmitted. The TIM information element includes a TIM for indicating a unicast frame and a delivery traffic indication map (DTIM) for indicating a multicast or broadcast frame.

The AP 210 may transmit a DTIM once whenever the beacon frame is transmitted three times. Each of STA1 220 and STA2 222 operate in a PS mode. Each of STA1 220 and STA2 222 is switched from a sleep state to an awake state every wakeup interval of a predetermined period such that STA1 220 and STA2 222 may be configured to receive the TIM information element transmitted by the AP 210. Each STA may calculate a switching start time at which each STA may start switching to the awake state based on its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state when the AP 210 first transmits the beacon frame (S211). STA1 220 may receive the beacon frame and obtain the TIM information element. If the obtained TIM element indicates the presence of a frame to be transmitted to STA1 220, STA1 220 may transmit a power save-Poll (PS-Poll) frame, which requests the AP 210 to transmit the frame, to the AP 210 (S221a). The AP 210 may transmit the frame to STA1 220 in response to the PS-Poll frame (S231). STA1 220 which has received the frame is re-switched to the sleep state and operates in the sleep state.

When the AP 210 secondly transmits the beacon frame, since a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, STA1 does not receive the delay-transmitted beacon frame so that it re-enters the sleep state (S222).

When the AP 210 thirdly transmits the beacon frame, the corresponding beacon frame may include a TIM element configured as a DTIM. However, since the busy medium state is given, the AP 210 transmits the beacon frame at a delayed time (S213). STA1 220 is switched to the awake state in response to the beacon interval and may obtain a DTIM through the beacon frame transmitted by the AP 210. It is assumed that the DTIM obtained by STA1 220 does not have a frame to be transmitted to STA1 220 and there is a frame for another STA. In this case, STA1 220 may confirm the absence of a frame to be received in the STA1 220 and re-enters the sleep state so that the STA1 220 may operate in the sleep state. After transmitting the beacon frame, the AP 210 transmits the frame to the corresponding STA (S232).

The AP 210 fourthly transmits the beacon frame (S214). However, since it was impossible for STA1 220 to obtain information regarding the presence of buffered traffic associated therewith through previous double reception of a TIM element, STA1 220 may adjust the wakeup interval for receiving the TIM element. Alternatively, provided that signaling information for coordination of the wakeup interval value of STA1 220 is contained in the beacon frame transmitted by the AP 210, the wakeup interval value of the STA1 220 may be adjusted. In this example, STA1 220, which has been switched to receive a TIM element every beacon interval, may be configured to be switched to another operation state in which STA1 220 awakes from the sleep state once every three beacon intervals. Therefore, when the AP 210 transmits a fourth beacon frame (S214) and transmits a fifth beacon frame (S215), STA1 220 maintains the sleep state such that it cannot obtain the corresponding TIM element.

When the AP 210 sixthly transmits the beacon frame (S216), STA1 220 is switched to the awake state and operates in the awake state, so that the STA1 220 may obtain the TIM element contained in the beacon frame (S224). The TIM element is a DTIM indicating the presence of a broadcast frame. Accordingly, STA1 220 does not transmit the PS-Poll frame to the AP 210 and may receive the broadcast frame transmitted by the AP 210 (S234). In the meantime, the wakeup interval configured for STA2 230 may be longer than the wakeup interval of STA1 220. Accordingly, STA2 230 may enter the awake state at a specific time (S215) where the AP 210 fifthly transmits the beacon frame and receives the TIM element (S241). STA2 230 may recognize the presence of a frame to be transmitted thereto through the TIM element and transmit the PS-Poll frame to the AP 210 to request frame transmission (S241*a*). The AP 210 may transmit the frame to STA2 230 in response to the PS-Poll frame (S233).

In order to manage a PS mode shown in FIG. 9, the TIM element may include either a TIM indicating the presence or absence of a frame to be transmitted to the STA or include a DTIM indicating the presence or absence of a broadcast/multicast frame. The DTIM may be implemented through field setting of the TIM element.

Figure 10:
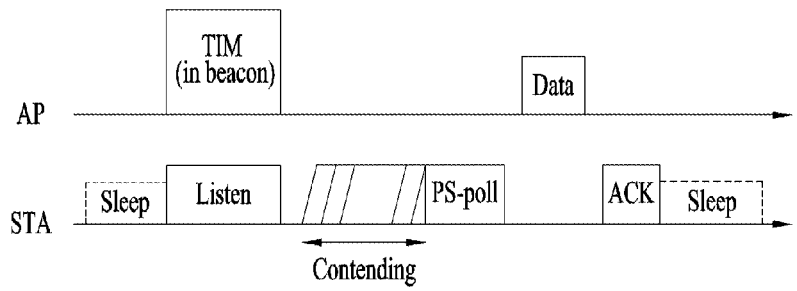
FIGS. 10 to 12 illustrate operations of a station (STA) having received a TIM in detail.
Figure 11:
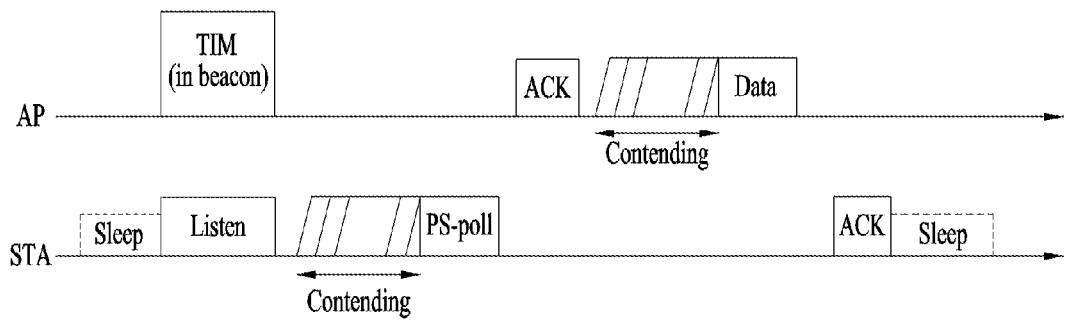
Figure 12:
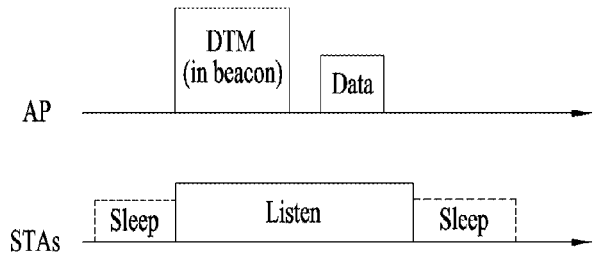

FIGS. 10 to 12 are diagrams for explaining detailed operations of an STA that has received a TIM.

Referring to FIG. 10, an STA is switched from a sleep state to an awake state so as to receive a beacon frame including a TIM from an AP. The STA may recognize the presence of buffered traffic to be transmitted thereto by interpreting the received TIM element. After contending with other STAs to access a medium for PS-Poll frame transmission, the STA may transmit the PS-Poll frame for requesting data frame transmission to the AP. Upon receiving the PS-Poll frame transmitted by the STA, the AP may transmit the frame to the STA. The STA may receive a data frame and then transmit an ACK frame to the AP in response to the received data frame. Thereafter, the STA may re-enter the sleep state.

As illustrated in FIG. 10, the AP may operate according to an immediate response scheme in which the AP receives the PS-Poll frame from the STA and transmits the data frame after a predetermined time (e.g. a short interframe space (SIFS)). Meanwhile, if the AP does not prepare a data frame to be transmitted to the STA during the SIFS time after receiving the PS-Poll frame, the AP may operate according to a deferred response scheme and this will be described with reference to FIG. 11.

The STA operations of FIG. 11 in which an STA is switched from a sleep state to an awake state, receives a TIM from an AP, and transmits a PS-Poll frame to the AP through contention are identical to those of FIG. 10. Even upon receiving the PS-Poll frame, if the AP does not prepare a data frame during an SIFS time, the AP may transmit an ACK frame to the STA instead of transmitting the data frame. If the data frame is prepared after transmission of the ACK frame, the AP may transmit the data frame to the STA after completion of contention. The STA may transmit the ACK frame indicating that the data frame has successfully been received to the AP and transition to the sleep state.

FIG. 12 illustrates an exemplary case in which an AP transmits a DTIM. STAs may be switched from the sleep state to the awake state so as to receive a beacon frame including a DTIM element from the AP. The STAs may recognize that a multicast/broadcast frame will be transmitted through the received DTIM. After transmission of the beacon frame including the DTIM, the AP may directly transmit data (i.e. the multicast/broadcast frame) without transmitting/receiving a PS-Poll frame. While the STAs continuously maintains the awake state after reception of the beacon frame including the DTIM, the STAs may receive data and then switch to the sleep state after completion of data reception.

TIM Structure

In the operation and management method of the PS mode based on the TIM (or DTIM) protocol described with reference to FIGS. 9 to 12, STAs may determine whether a data frame to be transmitted for the STAs through STA identification information contained in a TIM element. The STA identification information may be information associated with an AID to be allocated when an STA is associated with an AP.

The AID is used as a unique ID of each STA within one BSS. For example, the AID for use in the current WLAN system may be allocated as one of 1 to 2007. In the currently defined WLAN system, 14 bits for the AID may be allocated to a frame transmitted by an AP and/or an STA. Although the AID value may be assigned up to 16383, the values of 2008 to 16383 are set to reserved values.

A TIM element according to legacy definition is inappropriate to apply an M2M application through which many STAs (for example, more than 2007 STAs) are associated with one AP. If a conventional TIM structure is extended without any change, since the TIM bitmap size excessively increases, it is impossible to support the extended TIM structure using a legacy frame format and the extended TIM structure is inappropriate for M2M communication in which application of a low transfer rate is considered. In addition, it is expected that there are a very small number of STAs each having a reception data frame during one beacon period. Therefore, according to exemplary application of the above-mentioned M2M communication, since it is expected that most bits are set to zero (0) although the TIM bitmap size is increased, technology capable of efficiently compressing a bitmap is needed.

In legacy bitmap compression technology, successive values of 0 are omitted from a front part of a bitmap and the omitted result may be defined as an offset (or start point) value. However, although STAs each including a buffered frame is small in number, if there is a high difference between AID values of respective STAs, compression efficiency is not high. For example, assuming that only a frame to be transmitted to two STAs having AID values of 10 and 2000 is buffered, the length of a compressed bitmap is set to 1990 but the remaining parts other than both end parts are assigned zero. If fewer STAs are associated with one AP, inefficiency of bitmap compression does not cause serious problems. However, if the number of STAs associated with one AP increases, such inefficiency may deteriorate overall system performance.

In order to solve the above-mentioned problems, AIDs are divided into a plurality of groups such that data can be more efficiently transmitted. A designated group ID (GID) is allocated to each group. AIDs allocated on a group basis will be described with reference to FIG. 13.

Figure 13:
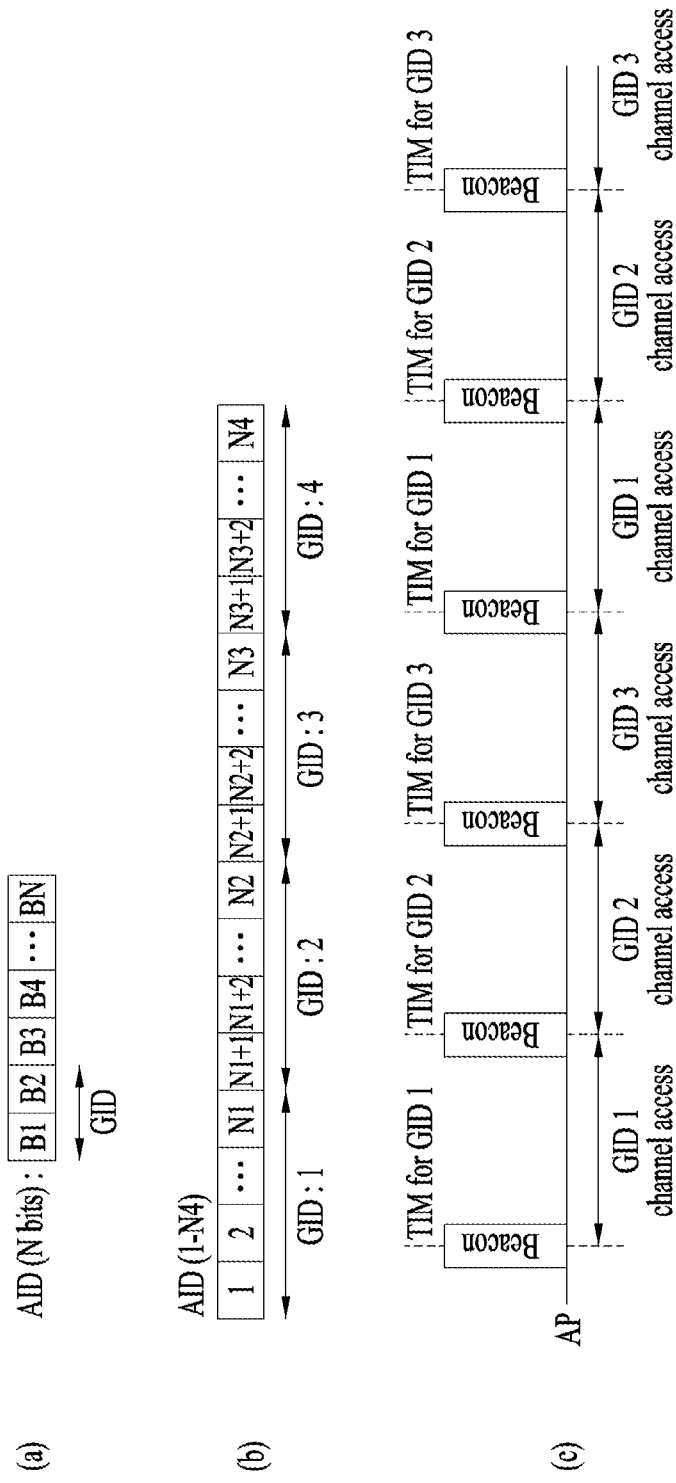
FIG. 13 illustrates a group-based AID.

FIG. 13(*a*) is a diagram illustrating an exemplary group-based AID. In FIG. 13(*a*), a few bits located at the front part of an AID bitmap may be used to indicate a GID. For example, it is possible to designate four GIDs using the first two bits of an AID bitmap. If a total length of the AID bitmap is N bits, the first two bits (B1 and B2) may represent a GID of the corresponding AID.

FIG. 13(*a*) is a diagram illustrating another exemplary group-based AID. In FIG. 13(*b*), a GID may be allocated according to the position of the AID. In this case, AIDs having the same GID may be represented by offset and length values. For example, if GID 1 is denoted by offset A and length B, this means that AIDs of A to A+B−1 on a bitmap have GID 1. For example, FIG. 13(b) assumes that AIDs of 1 to N4 are divided into four groups. In this case, AIDs contained in GID 1 are denoted by 1 to N1 and the AIDs contained in this group may be represented by offset 1 and length N1. Next, AIDs contained in GID 2 may be represented by offset N1+1 and length N2−N1+1, AIDs contained in GID 3 may be represented by offset N2+1 and length N3−N2+1, and AIDs contained in GID 4 may be represented by offset N3+1 and length N4−N3+1.

If the aforementioned group-based AIDs are introduced, channel access may be allowed in a different time interval according to GIDs, so that the problem caused by the insufficient number of TIM elements with respect to a large number of STAs can be solved and at the same time data can be efficiently transmitted/received. For example, during a specific time interval, channel access is allowed only for STA(s) corresponding to a specific group and channel access to the remaining STA(s) may be restricted. A predetermined time interval in which access to only specific STA(s) is allowed may also be referred to as a restricted access window (RAW).

Channel access based on GID will now be described with reference to FIG. 13(c). FIG. 13(c) exemplarily illustrates a channel access mechanism according to a beacon interval when AIDs are divided into three groups. A first beacon interval (or a first RAW) is a specific interval in which channel access to STAs corresponding to AIDs contained in GID 1 is allowed and channel access of STAs contained in other GIDs is disallowed. To implement this, a TIM element used only for AIDs corresponding to GID 1 is contained in a first beacon. A TIM element used only for AIDs corresponding to GID 2 is contained in a second beacon frame. Accordingly, only channel access to STAs corresponding to the AIDs contained in GID 2 is allowed during a second beacon interval (or a second RAW). A TIM element used only for AIDs having GID 3 is contained in a third beacon frame, so that channel access to STAs corresponding to the AIDs contained in GID 3 is allowed during a third beacon interval (or a third RAW). A TIM element used only for AIDs having GID 1 is contained in a fourth beacon frame, so that channel access to STAs corresponding to the AIDs contained in GID 1 is allowed during a fourth beacon interval (or a fourth RAW). Thereafter, only channel access to STAs belonging to a specific group indicated by a TIM contained in a corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is cyclical or periodic according to the beacon interval, the scope of the present invention is not limited thereto. That is, only AID(s) contained in specific GID(s) may be contained in a TIM element, so that channel access only to STA(s) corresponding to the specific AID(s) is allowed during a specific time interval (e.g. a specific RAW) and channel access to the remaining STA(s) is disallowed.

The aforementioned group-based AID allocation scheme may also be referred to as a hierarchical structure of a TIM. That is, a total AID space is divided into a plurality of blocks and channel access to STA(s) (i.e. STA(s) of a specific group) corresponding to a specific block having any one of values other than '0' may be allowed. Therefore, since a large-sized TIM is divided into small-sized blocks/groups, an STA can easily maintain TIM information and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of an AID bitmap may represent a page ID (i.e. PID), the next N2 bits may represent a block ID, the next N3 bits may represent a sub-block ID, and the remaining bits may represent the position of STA bits contained in a sub-block.

In the embodiments of the present invention described below, various schemes for dividing STAs (or AIDs allocated to the STAs respectively) into predetermined hierarchical group units and managing the same may be used, but the group-based AID allocation schemes are not limited to these embodiments.

Restricted Access Window (RAW)

Collision occurring between STAs that perform access simultaneously may reduce medium utilization. Accordingly, a RAW may be used as a method to distribute channel access from (group-based) STAs. An AP may assign a medium access interval called RAW between beacon intervals. RAW-related information (a Restricted Access Window Parameter Set (RPS) element) may be transmitted in a (short) beacon frame. In addition to the RAW, the AP may further assign one or more different RAWs related to other RAW parameters for another group between the beacon intervals.

Figure 14:
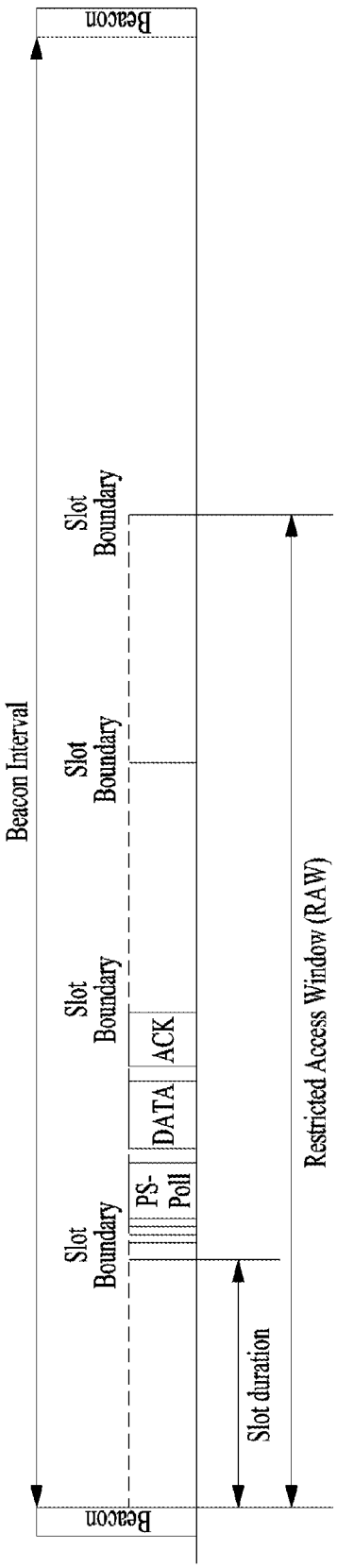

FIG. 14 shows an exemplary RAW. Referring to FIG. 14, STAs of a specific group corresponding to a RAW may perform access in the RAW (more specifically, in one of the slots of the RAW). Herein, the specific group may be indicated by, for example, an RAW Group field, which will be described later. In other words, an STA may recognize whether the AID thereof corresponds to a specific group (RAW group) by determining whether or not the AID is within an AID range indicated by, for example, the RAW Group field. For example, if the AID of the STA is greater than or equal to the lowest AID(N1) allocated to the RAW and less than or equal to the highest AID(N1) allocated to the RAW, the STA may be considered as belonging to a RAW group indicated by the RAW Group field. Herein, N1 may be determined by a concatenation of a Page Index subfield and an RAW Start AID subfield, and N2 may be determined by a concatenation of the Page Index subfield and an RAW End AID subfield. The subfields may be included in a RAW Group subfield in the RPS element.

If the STA corresponds to the RAW group illustrated in FIG. 14 (and is paged), the STA may perform access by transmitting a PS-Poll frame based on the DCF and EDCA in the slot allocated thereto. Herein, the allocated slot may be a slot allocated by the AP among the slots included in the RAW. The slot may be allocated in a manner as shown in FIG. 15. In FIGS. 15(a) and 15(b), a slot is basically determined by $i_{slot}=(x+N_{offset}) \bmod N_{RAW}$, wherein x is the AID of the STA, $i_{slot}$ is the slot index allocated to the STA, $N_{offset}$ denotes two least significant bytes (LSBs) of an FCS field of the (short) beacon frame, and $N_{RAW}$ is the number of time slots included in the RAW, which may be determined by a RAW Slot Definition subfield in the RPS element. FIG. 15(a) illustrates allocation of slots to AIDs performed regardless of whether the AID is set to 1 in the TIM bitmap, and FIG. 15(b) illustrates allocation of slots to only AIDs set to 1 in the TIM bitmap.

Restricted Access Window Parameter Set (RPS) Element

Figure 16:
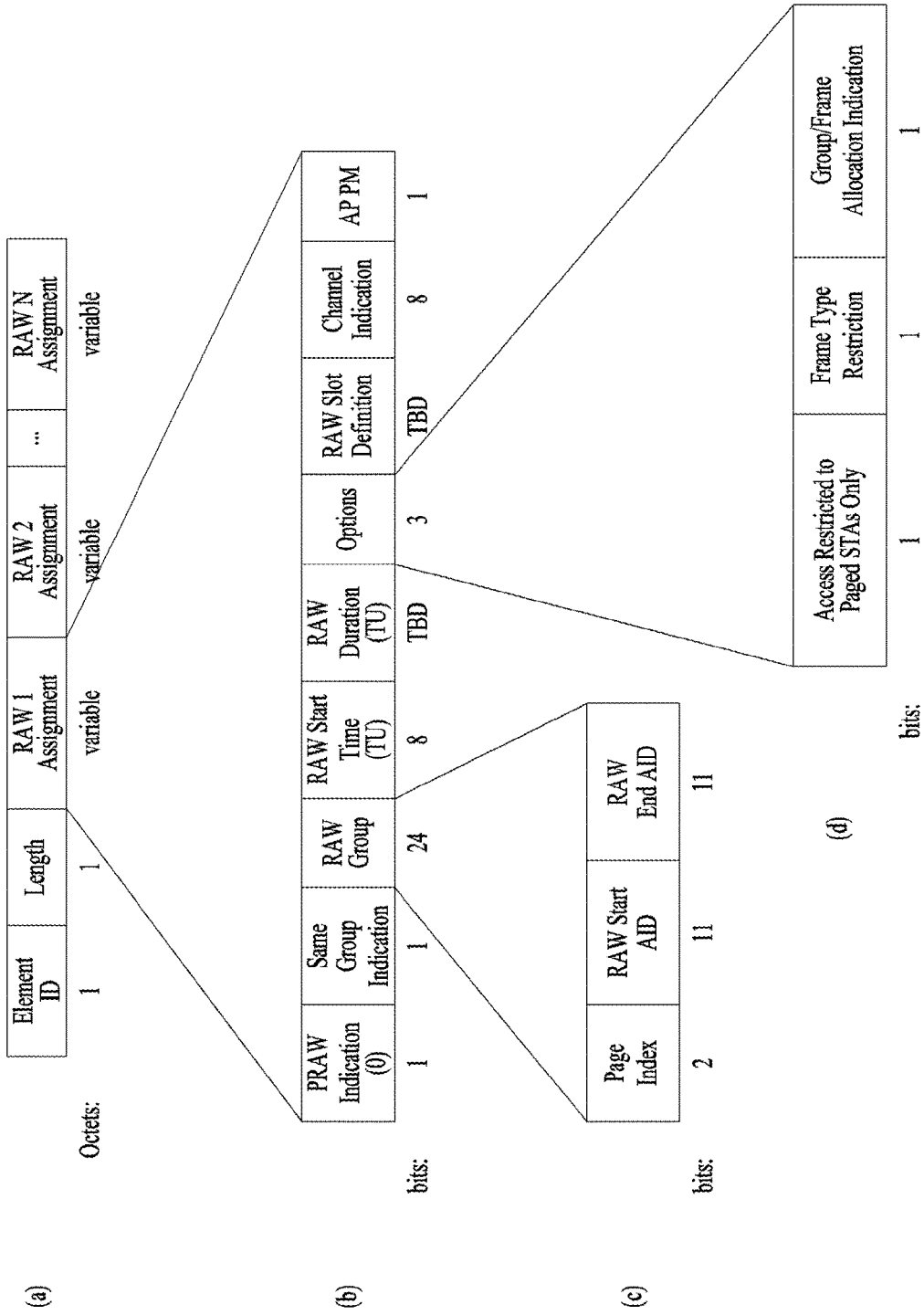

The RPS element includes a parameter set necessary for the RAW described above. This information field includes RAW Assignment fields for Groups 1 to N. FIG. 16 shows an RPS element. Specifically, FIG. 16(a) show fields constituting the RPS element, FIG. 16(b) shows subfields constituting the RAW N Assignment field, FIG. 16(c) shows configuration of a RAW Group subfield among the subfields of the RAW N Assignment field, and FIG. 16(d) shows configuration of an Options subfield among the subfields of the RAW N Assignment field.

Referring to FIG. 16(a), the RPS element may include an Element ID field, a Length field, and a RAW N Assignment field.

Referring to FIG. 16(b), the RAW N Assignment field may include a PRAW Indication subfield, a Same Group Indication subfield, a RAW Group subfield, a RAW Start Time subfield, a RAW Duration subfield, an Options subfield, and a RAW Slot Definition subfield.

The PRAW Indication subfield indicates whether the current RAW Assignment field is a normal RAW or a PRAW. The Same Group Indication subfield indicates whether a RAW group related to the current RAW Assignment field is the same as the RAW group defined in the previous RAW Assignment field. If the Same Group Indication subfield is set to 1, this indicates that the RAW group of the current RAW Assignment field is the same as the RAW group defined in the previous RAW Assignment field. In this case, the current RAW Assignment field does not include the RAW Group field. The RAW Group subfield indicates the AID range of the STAs of the group related to the current RAW Assignment field. As shown in FIG. 16(c), the RAW Group field may include Page Index, RAW Start AID and RAW End AID subfields. Since description of how the range of AID is determined by these subfields has been given above in relation to the RAW, it will not be given below.

The RAW Start Time subfield indicates time from the end time of beacon transmission to the start time of the RAW in units of TU. The RAW Duration subfield indicates the duration, in TU, of restricted medium access which is allocated to the RAW. The Options subfield includes an Access Restricted to Paged STAs Only subfield, which indicates whether only paged STAs are allowed to perform access in the RAW. The RAW Slot Definition subfield may include a Slot Duration subfield, a Slot Assignments subfield, and a Cross Slot Boundary subfield. For details of information which is included in the RPS element but is not described above and information/fields which are not specifically described above, refer to IEEE P802.11ah/D0.1.

As described above, the RAW is used as a method for allocating durations for channel access to STAs belonging to a specific group. Whether or not an STA belongs to the specific group is basically determined by the AID range indicated by the RAW Group field. However, if the TIM is contained in the beacon frame and slots of the RAW are allocated to the STAs indicated by the TIM, the RPS element does not necessarily include the RAW Group field for the RAW. In other words, if the AID range determined by the TIM bitmap is the same as the AID range indicated/determined by the RAW Group field, the RAW Group field may be omitted. This means that the bits of the RPS element may be reduced by 24×n bits and also means that the size of the beacon frame may be reduced. Hereinafter, relevant embodiments of the present invention will be described in detail.

Embodiment 1

As described above, the Same Group Indication subfield included in the RPS element indicates whether a RAW group related to the current RAW Assignment field is the same as the RAW group defined in the previous RAW Assignment field. Accordingly, if the current RAW Assignment field is the first RAW Assignment field of the RPS element, there is no RAW Assignment field preceding the current RAW Assignment field. Therefore, if the current RAW Assignment field is the first RAW Assignment field of the RPS element, the Same Group Indication subfield is always set to 0. If the current RAW Assignment field is the first RAW Assignment field of the RPS element, and the Same Group Indication subfield is set to 1, this may indicate that the AID range of the RAW group related to the current RAW Assignment field is the same as the information on the STAs contained in the TIM bitmap. That is, if the current RAW Assignment field is the first RAW Assignment field of the RPS element, and the Same Group Indication subfield is set to 1, the AID range to be determined by the RAW Group field may be set to be determined by the TIM bitmap. In this case, the range of AIDs corresponding to the RAW group related to the current RAW Assignment field is indicated by the TIM bitmap contained in the (short) beacon frame, and therefore the RPS element, more specifically, the RAW Assignment field, need not include a RAW Group subfield.

With the configuration as above, an STA performs access as follows. The STA receives a predetermined frame including a timestamptimestamp, i.e., a (short) beacon frame, and checks the RAW Assignment field included in the predetermined frame. If the STA belongs to a RAW group related to the RAW Assignment field, it may perform access in a time slot determined based on the subfields of the RAW Assignment field. Herein, whether or not the STA belongs to the RAW group is determined depending on whether or not the AID of the STA is within the AID range. If the RAW Assignment field is the second RAW Assignment field or a RAW Assignment field after the second RAW Assignment field in the RPS element, the range of AIDs may be determined by the RAW Group field. If the RAW Assignment field is the first RAW Assignment field in the RPS element, and the Same Group Indication is set to 1, the range of AIDs may be determined by the TIM bitmap. The access of the STA described above relates to a situation in which the first bit of the Options subfield included in the same subfield containing the Same Group Indication (i.e., Bit 0, the Access Restricted to Paged STAs Only subfield) is set to 0. Regarding operation of the STA described above, the STA performs access if the AID of the STA is within the AID range. This is because access is allowed once the first bit of the Options subfield is set to 0 even when the STA in the AID range is not paged in the TIM bitmap. If the first bit (Bit 0) of the Options subfield is set to 1, channel access is allowed only when the STA is paged in the TIM. Additionally, when the RAW Assignment field is the second RAW Assignment field or a RAW Assignment field after the second RAW Assignment field in the RPS element, the range of AIDs may be determined by the RAW Group field if the Same Group Indication is set to 0 and determined by the previous RAW Assignment field if the Same Group Indication is set to 1. In this case, if the Same Group Indication is set to 1 in the first RAW Assignment field, the Same Group Indication of the second or further RAW Assignment field set to 1 indicates that the AID range for the second or further RAW is also the same as the AID range indicated by the TIM bitmap.

In summary, if the Same Group Indication of the first RAW Assignment field is set to 1, this indicates that the RAW group of the first RAW Assignment field is determined by the TIM bitmap of a (short) beacon frame. This in turn indicates that the TIM bitmap is included in the (short)

beacon frame, the Page Index is set to the page index of the TIM bitmap, the RAW Start AID subfield is set to the lowest AID in the TIM bitmap, and the RAW End AID subfield is set to the highest AID in the TIM bitmap. When two or more TIM bitmaps are included in a beacon, the Same Group Indication bit in the first RAW Assignment field is preferably set to 1 only if Bit 0 of the Options subfield is set to 1. A specific method may be determined when the AP is implemented. In this case, a RAW Start AID and a relevant Page Index are set to the lowest AID in the first TIM bitmap and the page index of the TIM bitmap, while a RAW End AID and a relevant Page Index are set to the highest AID in the TIM bitmap and the page index of the TIM bitmap.

Figure 17:
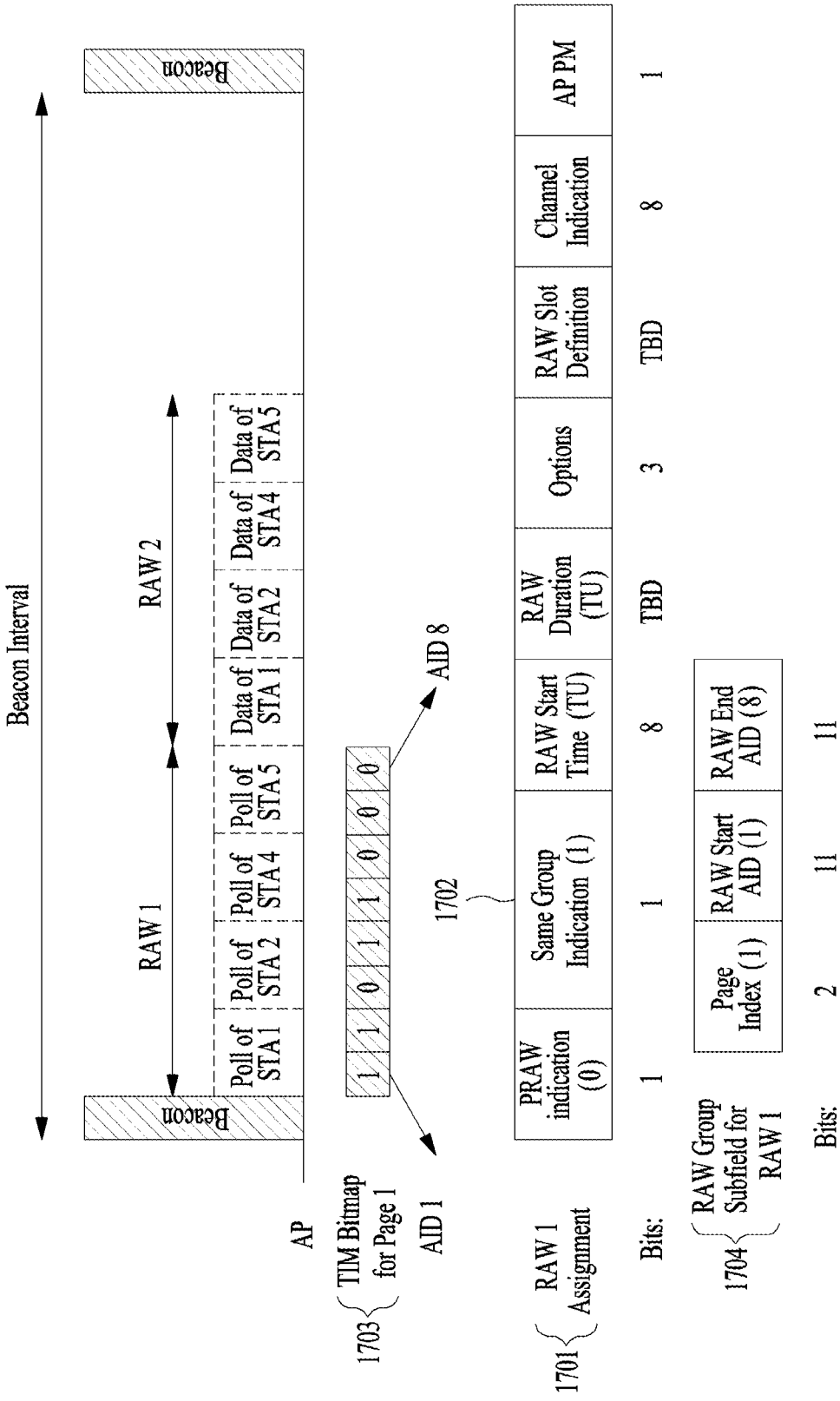
FIGS. 17 to 25 illustrate Embodiment 1 of the present invention.

FIG. 17 illustrates the RAW Assignment field described above. As shown in FIG. 17, if Same Group Indication 1702 of RAW 1 Assignment field 1701 is set to 1, this means that a RAW group AID range related to RAW 1 is determined by a TIM bitmap 1703 contained in the beacon frame. In FIG. 17, the AID range in the TIM bitmap corresponds to AIDs 1 to 8, and thus the AID range of the RAW group related to the RAW 1 Assignment field also corresponds to AIDs 1 to 8. If information of the RAW Group subfield is determined based on the information on the STAs indicated by the TIM bitmap, the field may be configured as the RAW Group subfield 1704 shown in the figure. In the example of FIG. 17, the Options subfield (a subfield indicting whether or not access is restricted to paged STAs only, which may be an Access Restricted to Paged STAs Only subfield) is set to 1, namely only paged STAs 1, 2, 4 and 5 in the TIM bitmap are assigned the slots of the RAW. Herein, the relationship between the STAs and slot assignment may be different from the relationship illustrated in the figure. Hereinafter, various variants of the examples described above will be described with reference to FIGS. 18 to 26. Descriptions of FIGS. 18 to 26 are based on the comprehensive description of Embodiment 1 given above. If not specifically mentioned otherwise, the details of FIG. 17 are applied to the variants.

Figure 18:
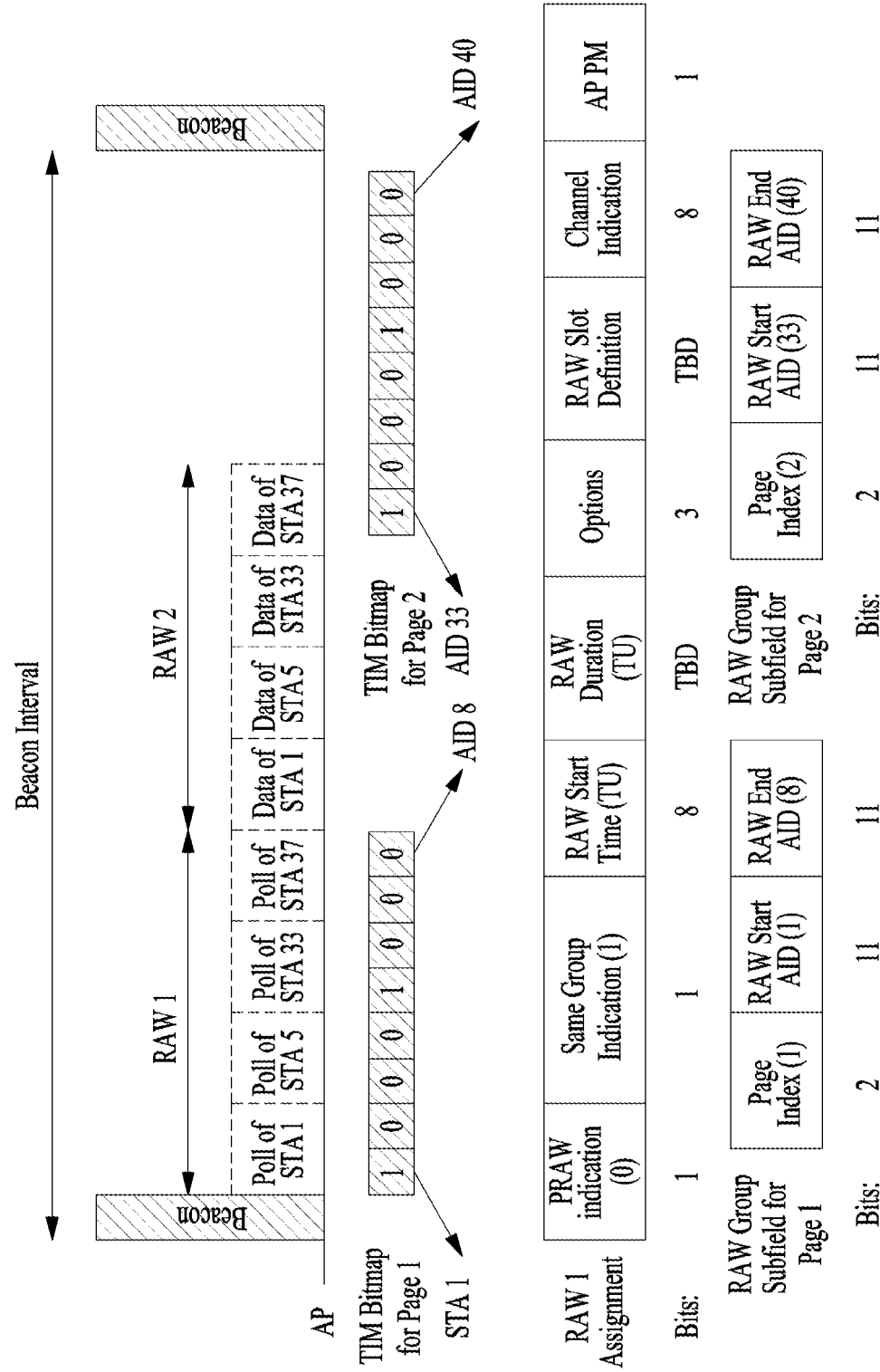

FIG. 18 illustrates an example with a TIM bitmap for Page 1 (AID range of AID 1 to AID 8) and a TIM bitmap for Page 2 (AID range of AID 33 to AID 40). When the Same Group Indication subfield is set to 1, the AID range of a RAW group related to the RAW 1 Assignment field may be the AID ranges corresponding to the TIM bitmaps for Page 1 and Page 2, i.e., AIDs 1 to 8 and 33 to 40. When the RAW Group field is used, two RAW Group subfields as shown in the figure may be used. If the Option is set to 0, RAW 1 may be assigned to STAs 1 to 8 and 33 to 40, which is different from the illustrated example.

Figure 19:
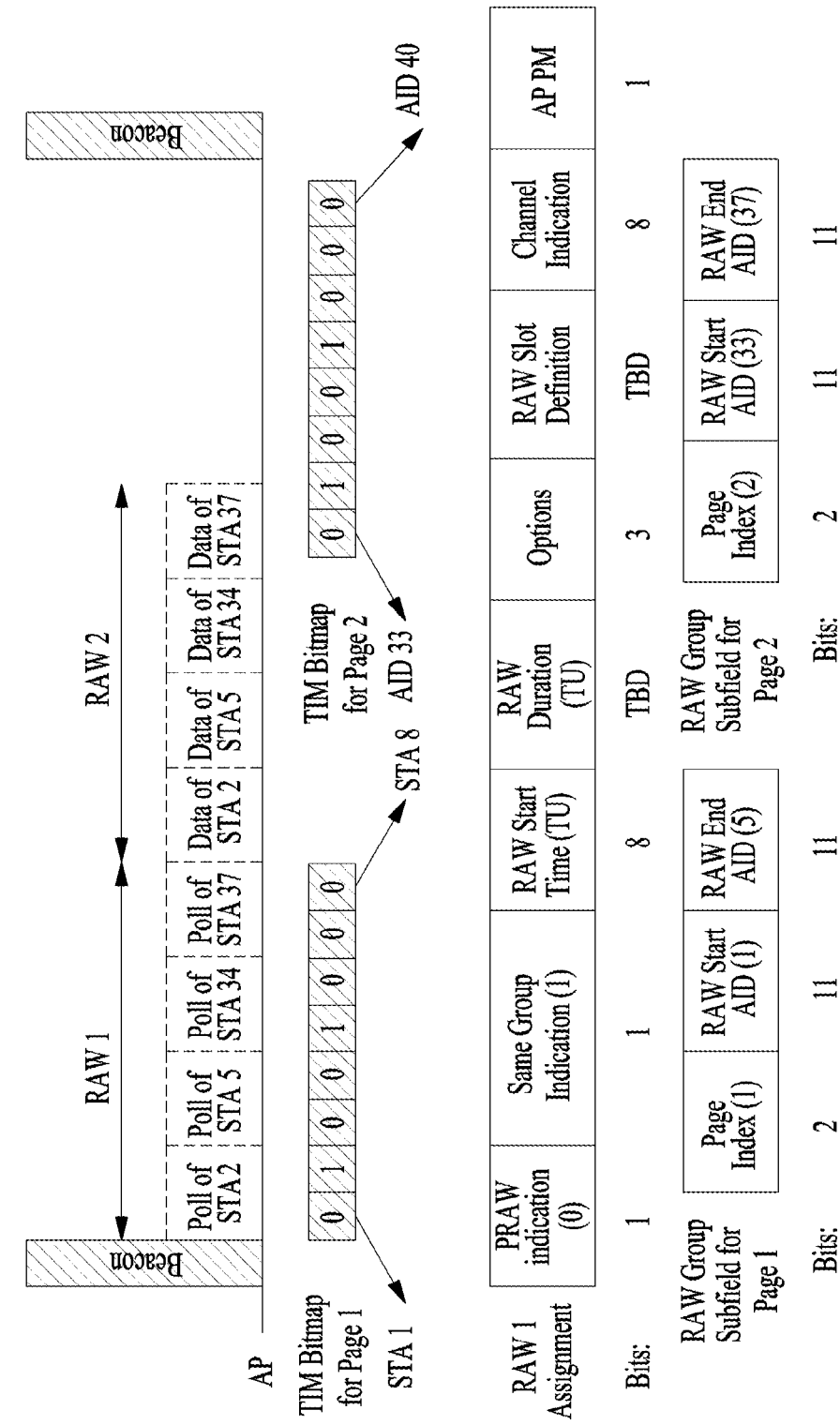

FIG. 19 illustrates an example with a TIM bitmap for Page 1 (AID range of AID 1 to AID 8) and a TIM bitmap for Page 2 (AID range of AID 33 to AID 40) as in the example of FIG. 18. Contrary to the example of FIG. 18, the AID range corresponds to the first AID indicated by the TIM bitmap to the AID of the last paged STA indicated by the TIM bitmap. That is, the AID range covers AIDs 1 to 5 and AIDs 33 to 37.

Figure 20:
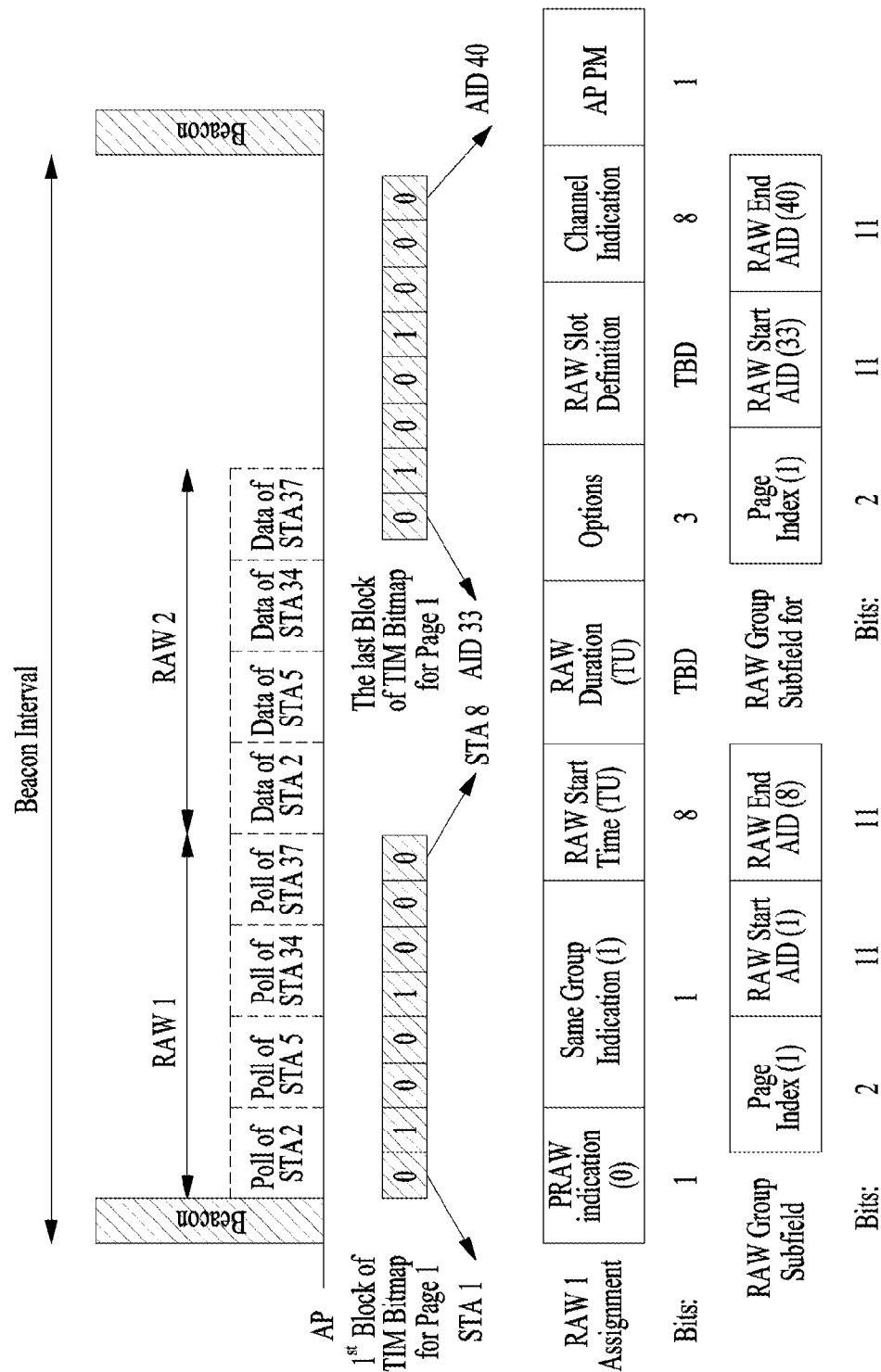

In the example of FIG. 20, the first block of the TIM bitmap for Page 1 includes STA information for AIDs 1 to 8, and another block of the TIM bitmap for Page 1 includes STA information for AIDs 33 to 40. In FIG. 20, when the Same Group Indication subfield is set to 1, the AID range of a RAW group related to the RAW 1 Assignment field may correspond to AIDs 1 to 8 and 33 to 40. When the RAW Group field is used, two RAW Group subfields as shown in the figure may be used. If the value of the Access Restricted to Page STAs Only bit corresponding to Bit 0 in the Options subfield is 0, RAW 1 may be assigned to STAs 1 to 8 and 33 to 40, in contrast with the illustrated example.

Figure 21:
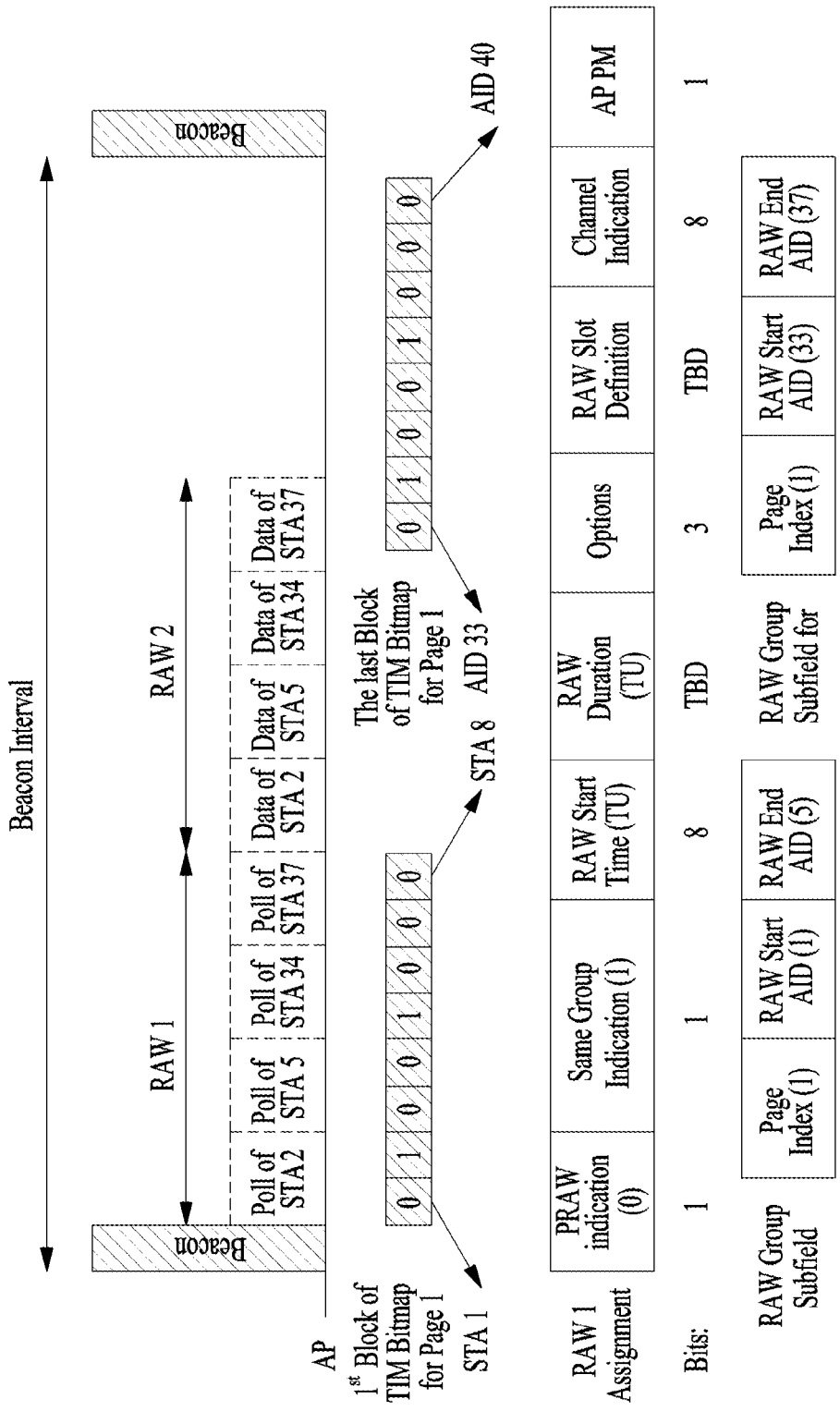

FIG. 21 illustrates an example similar to that of FIG. 20. In this example, the AID range covers the first AID of each block in a TIM bitmap to the AID of the last paged STA of each block in the TIM bitmap. That is, in FIG. 21, the AID range corresponds to AIDs 1 to 5 and AIDs 33 to 37.

Figure 22:
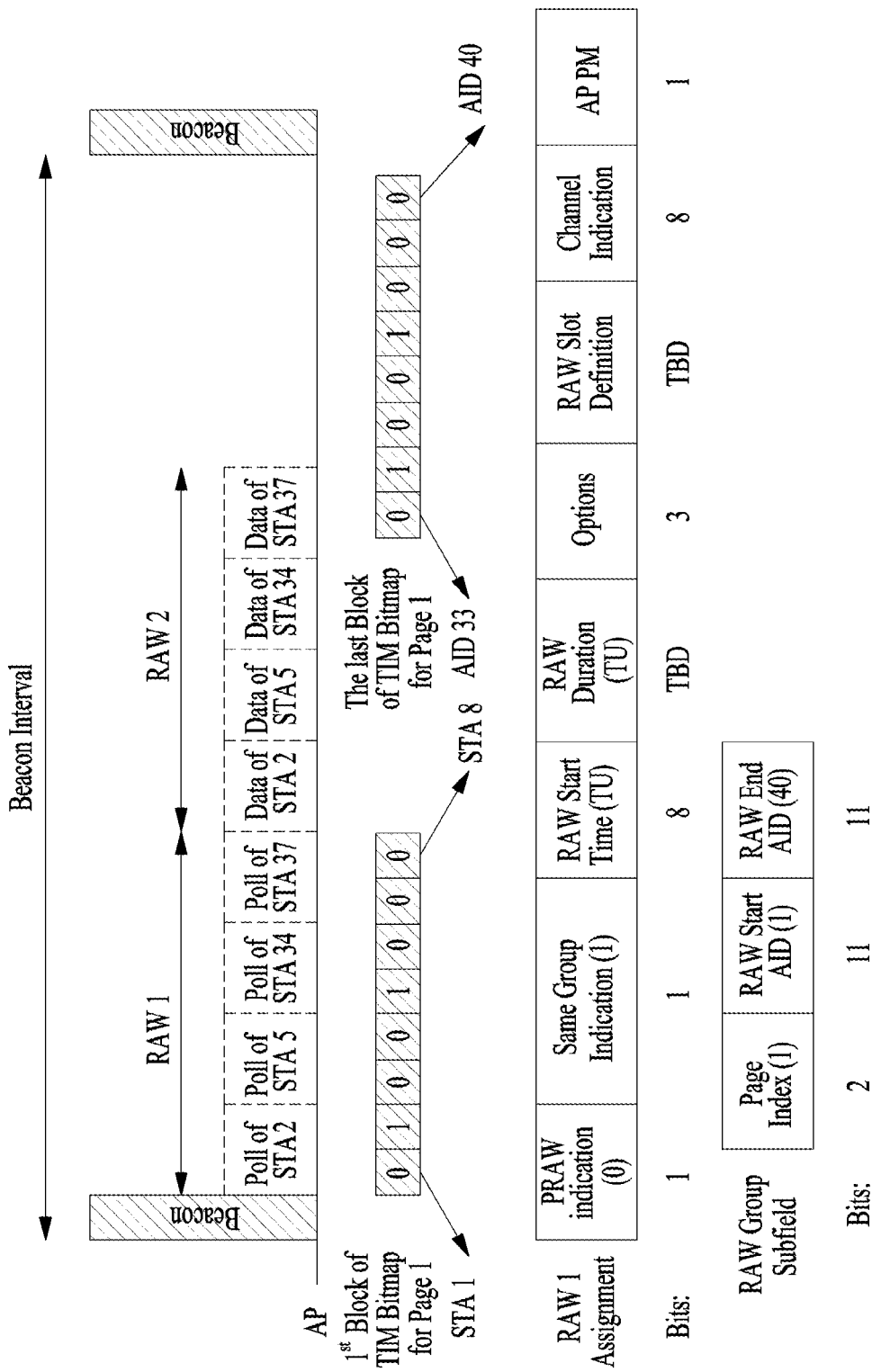

The example of FIG. 22 is different from that of FIG. 20 only in that the AID range covers the first AID of the first block in the TIM bitmap to the last AID of the last block in the TIM bitmap. That is, all STAs between the two blocks may be designated as STAs belonging to the RAW group.

Figure 23:
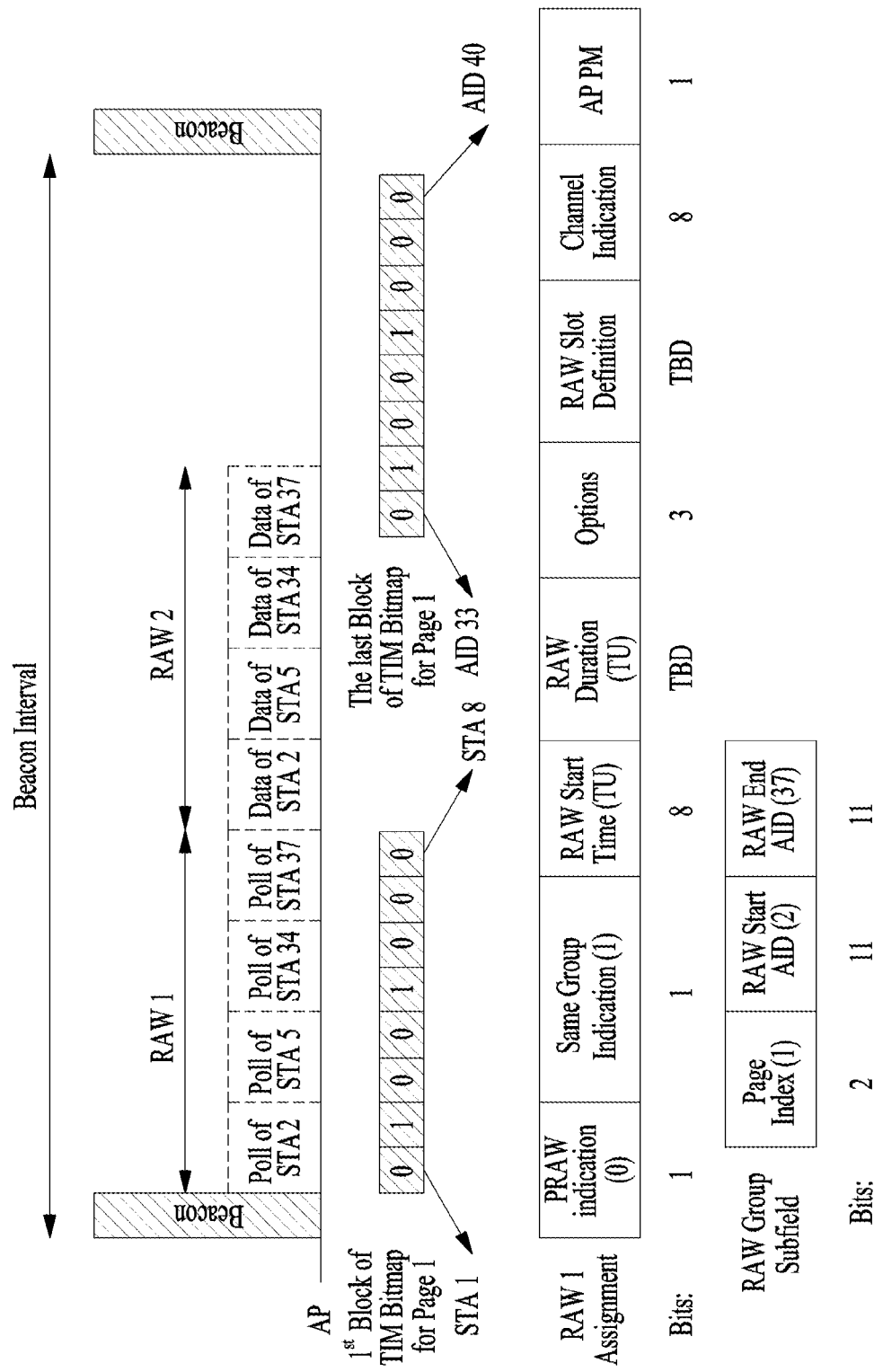

In the example of FIG. 23, AIDs between blocks are included in the AID range as in the example of FIG. 22. However, the example of FIG. 23 is different from that of FIG. 22 in that the start AID is the AID of the first paged STA of the first block and the last AID is the last paged AID of the last block. That is, in FIG. 23, the AID range corresponds to AIDs 2 to 37.

Figure 24:
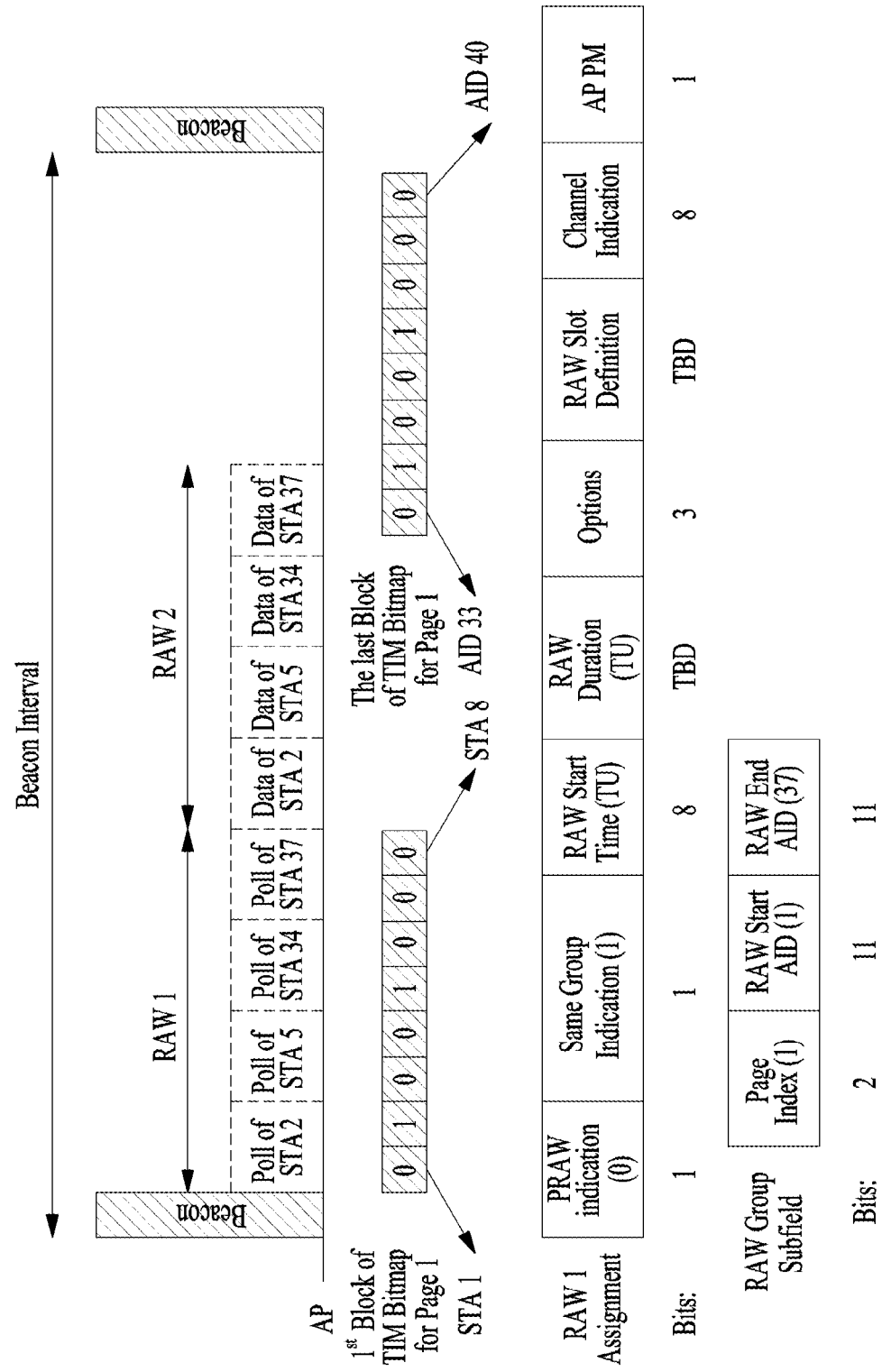

FIG. 24 also illustrates an example in which AIDs between blocks are included in the AID range as in the examples above. However, the example of FIG. 24 is different from the examples above in that the start AID is the AID of the first STA of the first block, and the last AID is the last paged AID of the last block.

Figure 25:
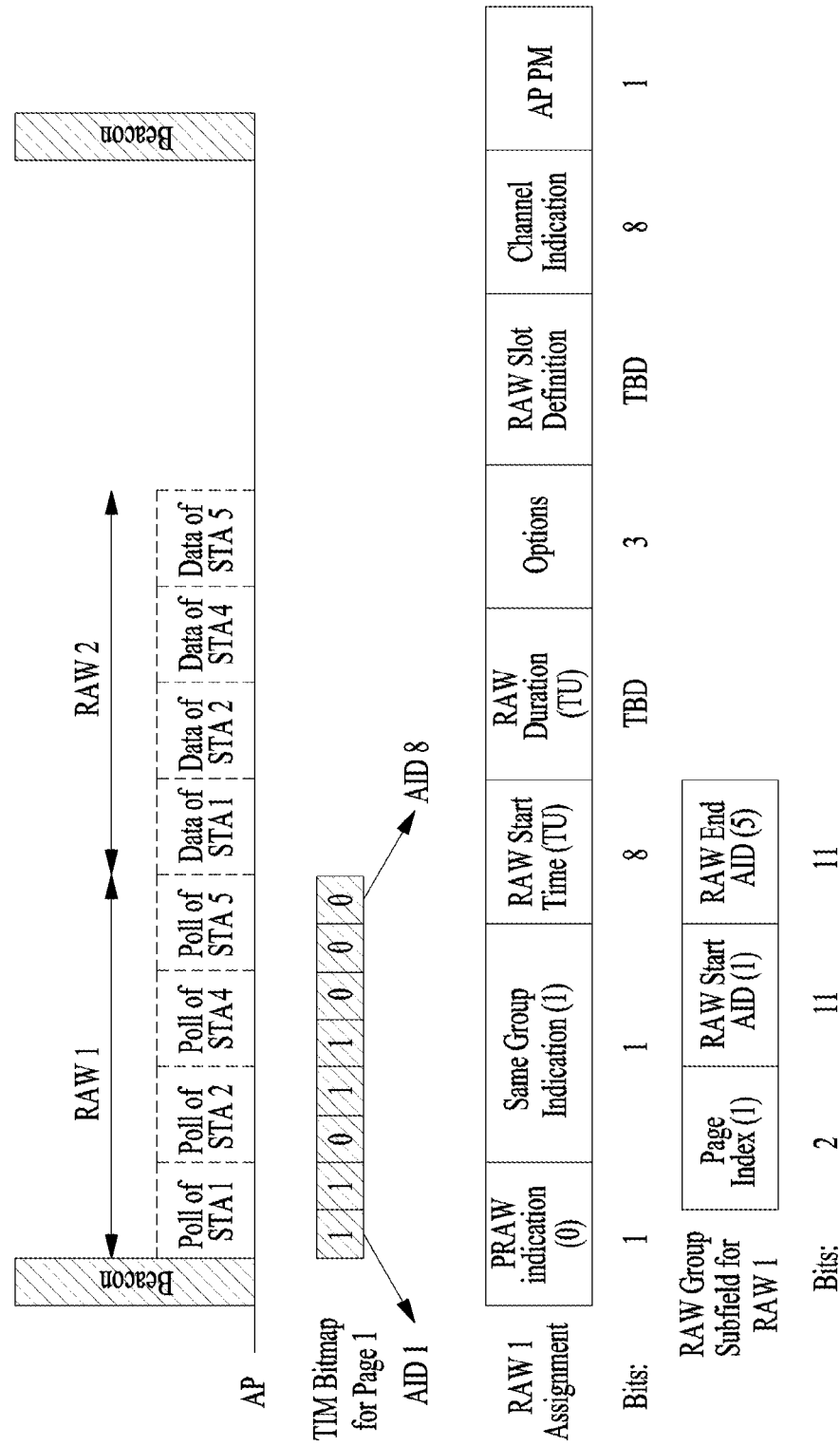
Figure 26:
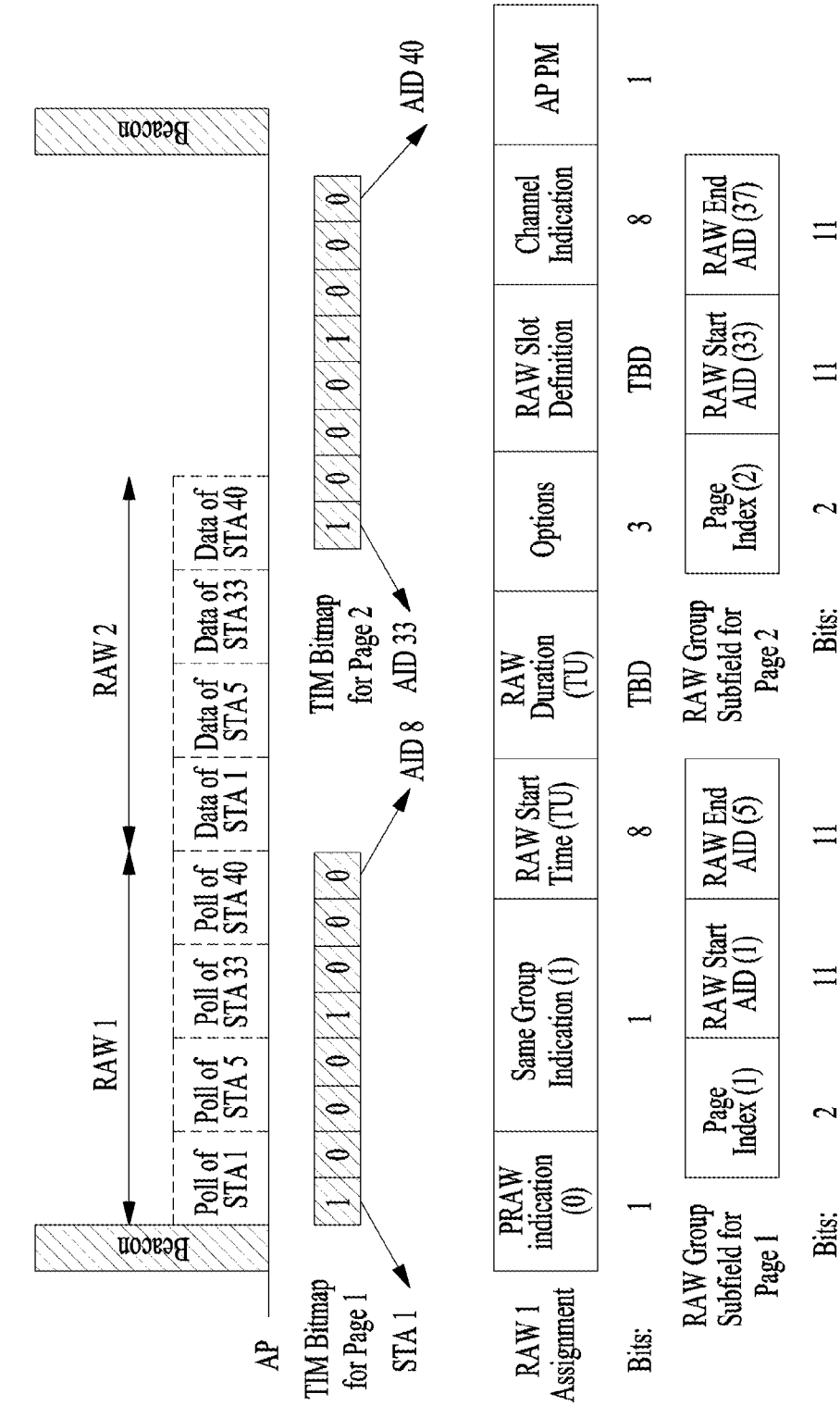

FIG. 25 illustrates another example in which the AID range corresponds to the first AID to a paged AID in the TIM bitmap. In other words, the AID range corresponds to AIDs 1 to 5. FIG. 26 illustrates another example having TIM bitmaps for two pages and an AID range corresponding to AIDs 1 to 5 and AIDs 33 to 37.

Embodiment 2

Unlike Embodiment 1 utilizing the Same Group Indication subfield, Embodiment 2 employs a new field (a Same TIM Indication subfield) indicating whether or not the RAW group related to the RAW Assignment field is the same as the group information indicated by the TIM IE. The Same TIM Indication subfield may indicate whether or not the RAW has been assigned the same information as the information on all STAs (group and AID information on STAs). FIG. 27 illustrates a RAW Assignment field including the Same TIM Indication subfield.

If the Same TIM Indication subfield is set to 1, this means that group information, which is the same as the information on all the STAs indicated by the TIM, is given. In this case, the AP may omit the RAW group subfield from the RPS element. If the Same TIM Indication subfield is set to 0, this means that the group information in the TIM is unrelated to the current RAW. Accordingly, a separate RAW group subfield is needed. FIG. 28 shows examples of a RAW Assignment field for the aforementioned two cases.

Figure 30:
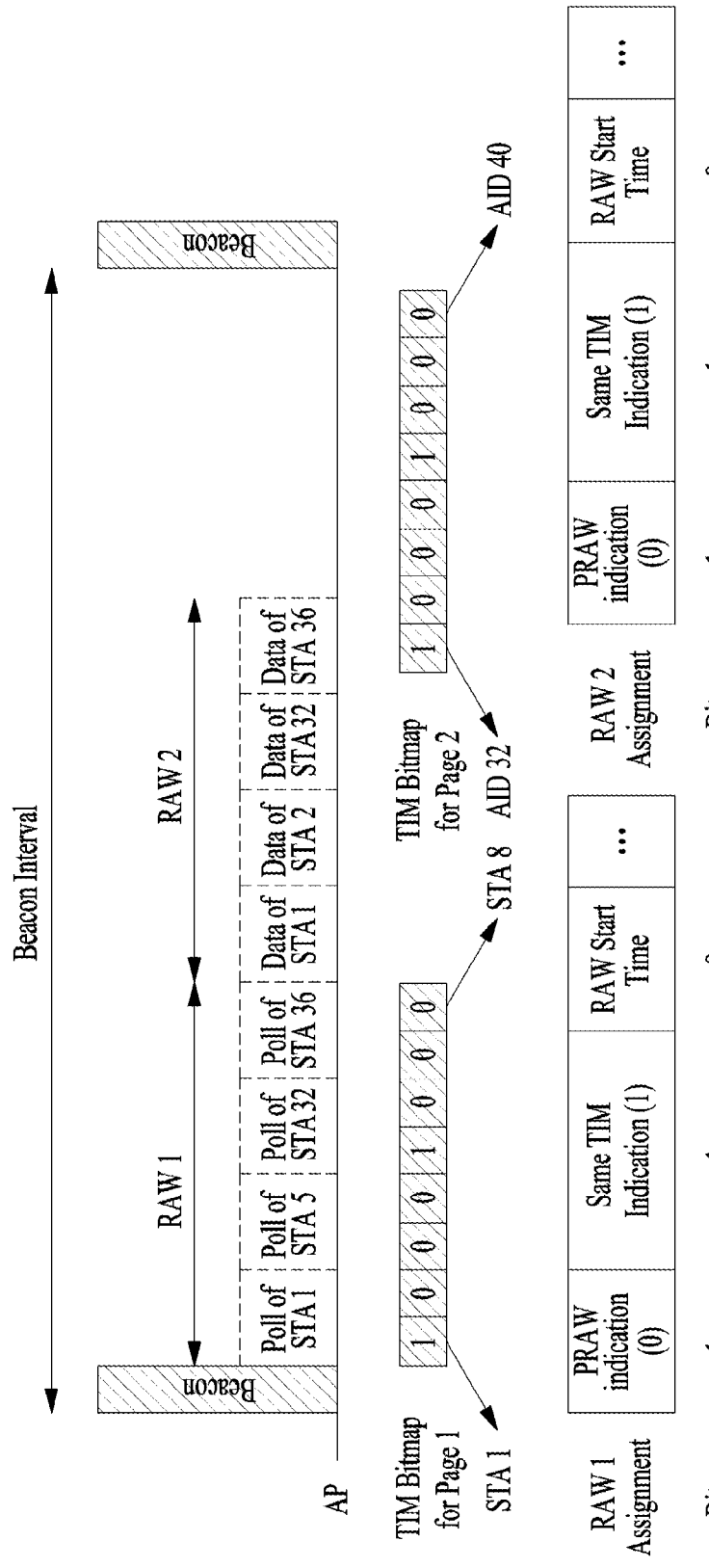

FIGS. 29 and 30 illustrate application of the RAW Assignment field according to Embodiment 2. Referring to FIG. 29, since the Same TIM Indication subfield is set to 1, AIDs 1 to 8, which is the range of AIDs indicated by the TIM bitmap, may correspond to the RAW group of the RAW Assignment field. In particular, FIG. 29 illustrates assignment of the RAW to only paged STAs in the TIM with the Options set to 1.

FIG. 30 illustrates application of the RAW Assignment field with a TIM bitmap for Page 1 and a TIM bitmap for Page 2. Since the Same TIM Indication subfields for the TIM bitmap are both set to 1, the AID range of a RAW group related to each RAW Assignment field is indicated by the TIM for each page.

Table 1 given below shows bits necessary for a RAW Assignment field prior to Embodiment 2, and Table 2 shows bits which are needed for a RAW Assignment field when Embodiment 2 is applied.

TABLE 1

| Feature | Value (bits) |
|---|---|
| IE type | 8 |
| IE length | 8 |
| PRAW Indication (0) | 1 |
| Same Group Indication | 1 |
| Page ID | 2 |
| RAW Start AID | 11 |
| RAW End AID | 11 |
| RAW Start Time | 8 |
| RAW Duration | 8 |
| Access restriction | 1 |
| Frame Type Restriction | 1 |
| Group/RA frame indication | 1 |
| RAW Slot definition | 12 |
| Channel | 8 |
| AP PM | 1 |
| Reserved | 6 |
| Total: | 88 |

TABLE 2

| Feature | Value (bits) |
|---|---|
| IE type | 8 |
| IE length | 8 |
| PRAW Indication (0) | 1 |
| Same TIM Indication | 1 |
| Same Group Indication | 1 |
| Page ID | 2 |
| RAW Start AID | 11 |
| RAW End AID | 11 |
| RAW Start Time | 8 |
| RAW Duration | 8 |
| Access restriction | 1 |
| Frame Type Restriction | 1 |
| Group/RA frame indication | 1 |
| RAW Slot definition | 12 |
| Channel | 8 |
| AP PM | 1 |
| Reserved | 5 |
| Total: | 88 |

According to Tables 1 and 2, if one TIM IE is transmitted (i.e., a TIM IE is transmitted for one page), and two RAWs are assigned, the conventional method needs IE Type & Length (16 bits)+2×RAW N Assignment (72 bits)=20 bytes (160 bits). On the other hand, in Embodiment 2, IE Type & Length (16 bits)+2×RAW N Assignment (48 bits)=14 bytes (112 bits) are needed, and thus the number of bits may be reduced by 6 bytes (Gain=20% overhead reduction).

If two TIM IEs are transmitted (i.e., TIM IEs are transmitted for two page), and two RAWs are assigned, a PS-Poll RAW and a data RAW are assigned to each page, the conventional method needs IE Type & Length (16 bits)+4× RAW N Assignment (72 bits)=38 bytes (304 bits). On the other hand, in Embodiment 2, IE Type & Length (16 bits)+2×RAW N Assignment (48 bits)=14 bytes (112 bits) are needed, and thus the number of bits may be reduced by 24 bytes (Gain=63% overhead reduction).

Details of various embodiments of the present invention described above may be independently employed or a combination of two or more embodiments may be implemented.

Configuration of Apparatus According to Embodiment of the Present Invention

Figure 31:
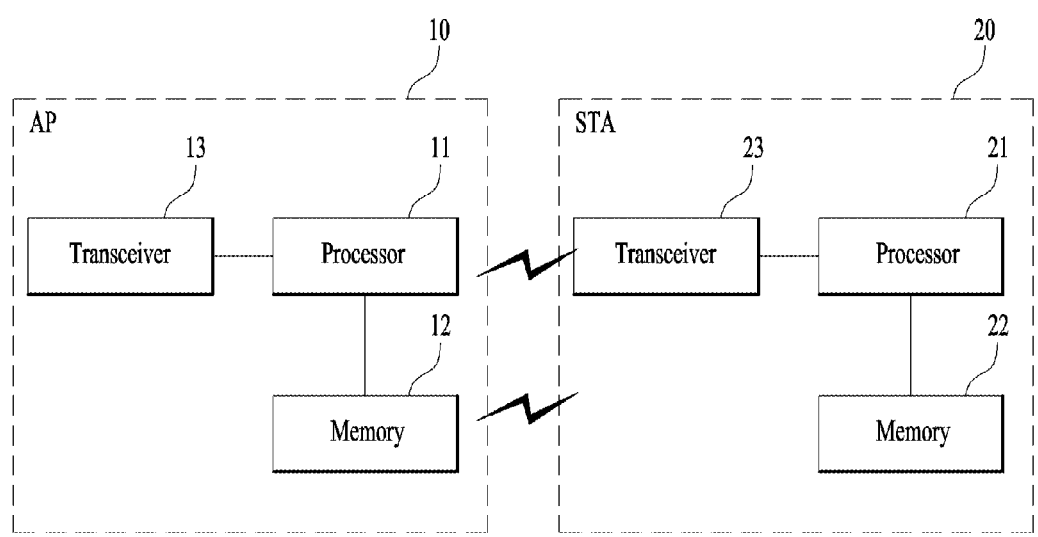
FIG. 31 is a block diagram illustrating a wireless apparatus according to one embodiment of the present invention.

FIG. 31 is a block diagram illustrating wireless apparatuses according to one embodiment of the present invention.

An AP 10 may include a processor 11, a memory 12, and a transceiver 13. An STA 20 may include a processor 21, a memory 22, and a transceiver 23. The transceivers 13 and 23 may transmit/receive wireless signals and implement, for example, a physical layer according to an IEEE 802 system. The processors 11 and 21 may be connected to the transceivers 13 and 23 to implement a physical layer and/or MAC layer according to an IEEE 802 system. The processors 11 and 21 may be configured to perform operations according to the various embodiments of the present invention described above. In addition, modules to implement operations of the AP and STA according to the various embodiments of the present invention described above may be stored in the memories 12 and 22 and executed by the processors 11 and 21. The memories 12 and 22 may be contained in or installed outside the processors 11 and 21 and connected to the processors 11 and 21 via well-known means.

Configuration of the AP and the STA may be implemented such that the details of the various embodiments of the present invention described above are independently applied or a combination of two or more embodiments is applied. For clarity, redundant description is omitted.

Embodiments of the present invention may be implemented by various means such as, for example, hardware, firmware, software, or combinations thereof.

When embodied as hardware, methods according to embodiments of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When embodied as firmware or software, methods according to embodiments of the present invention may be implemented in the form of a module, a procedure, a function, or the like which performs the functions or operations described above. Software code may be stored in the memory unit and executed by the processor. The memory unit may be disposed inside or outside the processor to transceive data with the processor via various well-known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit and scope of the invention set forth in the claims below. Thus, the present invention is not intended to be limited to the embodiments described herein, but is intended to include the widest range of embodiments corresponding to the principles and novel features disclosed herein.

INDUSTRIAL APPLICABILITY

Various embodiments of the present invention have been described through examples applied to an IEEE 802.11 system, but they may also be applied to other wireless access systems in the same manner.

What is claimed is:

1. A method for performing access to a medium by a station, STA, in a wireless communication system, the method comprising:
   checking a Restricted Access Window, RAW, Assignment field among a plurality of RAW Assignment fields included in a RAW Parameter Set, RPS, element of a beacon frame; and
   performing the access in a slot determined based on a first subfield of the RAW Assignment field when the STA belongs to a RAW group related to the RAW Assignment field among the plurality of RAW Assignment fields,
   wherein whether or not the STA belongs to the RAW group is determined depending on whether or not an association identifier, AID, of the STA is within an AID range,
   wherein each of the plurality of RAW Assignment fields comprises a second subfield indicating whether an AID range defined in each of the RAW Assignment fields is a same AID range that is defined in a previous RAW Assignment field of each of the RAW Assignment fields,
   wherein, when the RAW Assignment field is a first RAW Assignment field, having no previous RAW Assignment field, of the RPS element, the second subfield included in the first RAW Assignment field indicates whether or not the AID range defined in the first RAW Assignment field is determined by a traffic indication map, TIM, bitmap, and
   wherein, when the RAW Assignment field, having no previous RAW Assignment field, is the first RAW Assignment field of the RPS element and the second subfield included in the first RAW Assignment field indicating whether or not the AID range is determined by the TIM bitmap is set to a first value, the AID range defined in the first RAW Assignment field is determined by the TIM bitmap.

2. The method according to claim 1, wherein determining the AID range by the TIM bitmap comprises setting the AID range to be identical to an AID range of all TIM bitmaps in the beacon frame.

3. The method according to claim 1, wherein the second subfield indicating whether or not the AID range is determined by the TIM bitmap is a Same Group Indication subfield.

4. The method according to claim 1, wherein, when the second subfield of the first RAW Assignment field indicates that the AID range is determined by the TIM bitmap, the first RAW Assignment field does not comprise a RAW Group subfield indicating STA AIDs that are allowed access within a slot determined based on the first subfield of the first RAW Assignment field.

5. The method according to claim 1, wherein, when the RAW Assignment field is the first RAW Assignment field, having no previous RAW Assignment field, of an RPS element and the second subfield included in the first RAW Assignment field indicating whether or not the AID range is determined by the TIM bitmap is set to a second value, the AID range defined in the first RAW Assignment field is determined by a RAW Group subfield indicating STA AIDs that are allowed access within a slot determined based on the first subfield of the first RAW Assignment field.

6. The method according to claim 1, wherein an Options value contained in a subfield identical to the second subfield indicating whether or not the AID range is determined by the TIM bitmap is set to a second value.

7. The method according to claim 6, wherein STAs included in the AID range are allowed to perform the access even if the STAs are not paged in the TIM bitmap.

8. The method according to claim 1, wherein the TIM bitmap is contained in the beacon frame.

9. The method according to claim 1, wherein, when the RAW Assignment field is a second RAW Assignment field having a previous RAW Assignment field in an RPS element and the second subfield included in the second RAW Assignment field is set to the first value, the RAW Assignment field does not comprise a RAW Group field indicating STA AIDs that are allowed access within a slot determined based on the first subfield of the second RAW Assignment field.

10. A station, STA, for performing access to a medium in a wireless communication system, the STA comprising:
    a transceiver module; and
    a processor,
    wherein the processor is configured to:
    check a Restricted Access Window, RAW, Assignment field among a plurality of RAW Assignment fields included in a RAW Parameter Set, RPS, element of a beacon frame; and
    perform the access in a slot determined based on a first subfield of the RAW Assignment field when the STA belongs to a RAW group related to the RAW Assignment field among the plurality of RAW Assignment fields,
    wherein whether or not the STA belongs to the RAW group is determined depending on whether or not an association identifier, AID, of the STA is within an AID range,
    wherein each of the plurality of RAW Assignment fields comprises a second subfield indicating whether an AID range defined in each of the RAW Assignment fields is a same AID range that is defined in a previous RAW Assignment field of each of the RAW Assignment fields,
    wherein, when the RAW Assignment field is a first RAW Assignment field, having no previous RAW Assignment field, of the RPS element, the second subfield included in the first RAW Assignment field indicates whether or not the AID range defined in the first RAW Assignment field is determined by a traffic indication map, TIM, bitmap, and
    wherein, when the RAW Assignment field is the first RAW Assignment field, having no previous RAW Assignment field, of the RPS element and the second subfield included in the first RAW Assignment field indicating whether or not the AID range is determined by the TIM bitmap is set to a first value, the AID range defined in the first RAW Assignment field is determined by the TIM bitmap.

* * * * *